Figure 1:
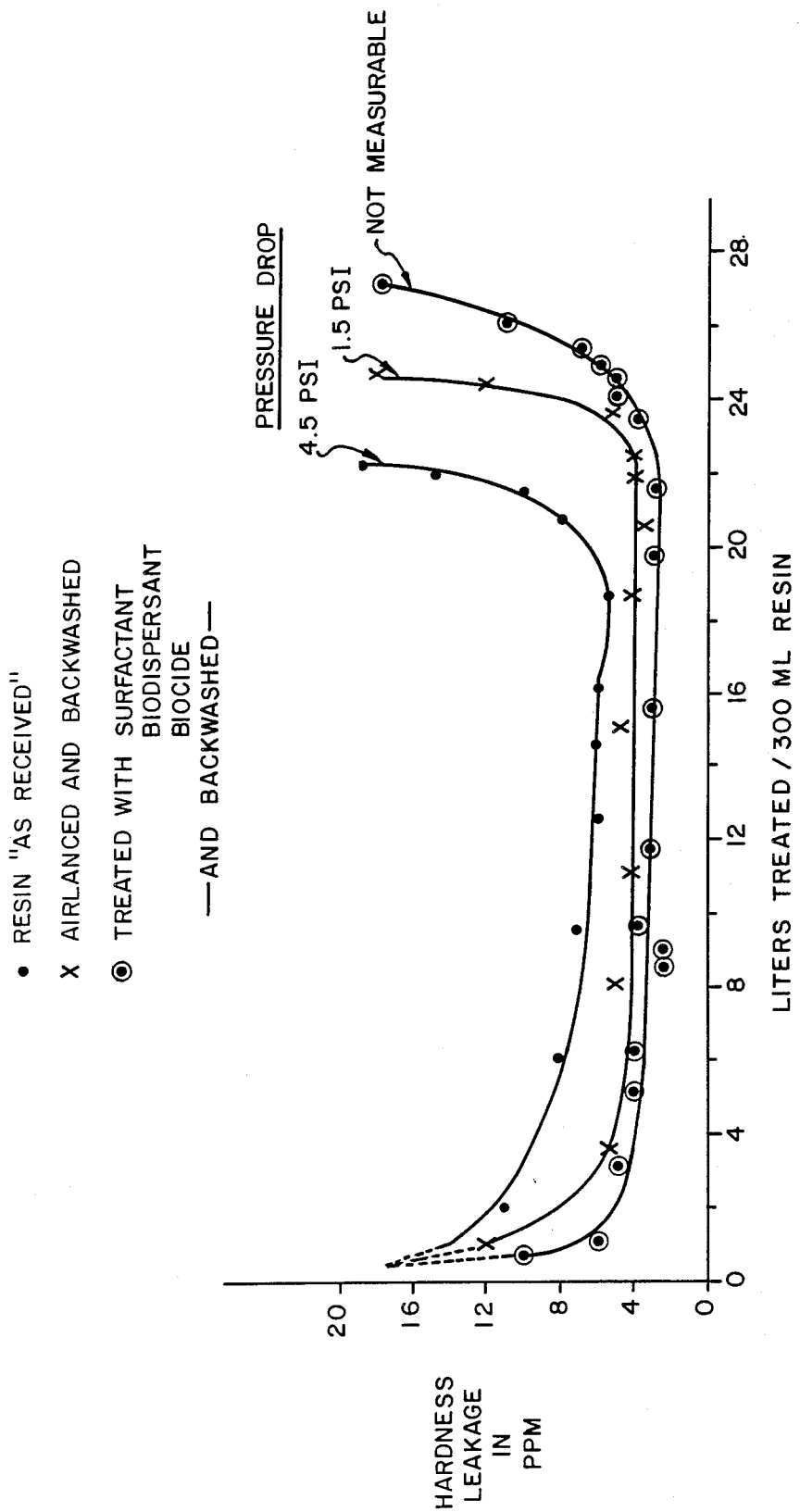

United States Patent [19]

Oberhofer

[11] Patent Number: 4,770,790

[45] Date of Patent: Sep. 13, 1988

[54] TREATMENT AND PREVENTION OF FOULED WATER TREATMENT SOLIDS

[75] Inventor: Alfred W. Oberhofer, Downers Grove, Ill.

[73] Assignee: Nalco Chemical Company, Naperville, Ill.

[21] Appl. No.: 617,152

[22] Filed: Jun. 5, 1984

Related U.S. Application Data

[63] Continuation of Ser. No. 503,685, Jun. 17, 1983, abandoned, which is a continuation-in-part of Ser. No. 401,434, Jul. 29, 1982, abandoned.

[51] Int. Cl.$^4$ .............................................. B01J 49/00
[52] U.S. Cl. ................................... 210/673; 210/674; 134/25.1; 134/40; 252/95; 252/102; 252/103; 521/26
[58] Field of Search ................... 134/25.1, 40; 252/95, 252/102, 103; 210/673, 674; 521/26

[56] References Cited

U.S. PATENT DOCUMENTS

| | | |
|---|---|---|
| 2,861,948 | 11/1958 | McKellar . |
| 3,123,553 | 3/1964 | Abrams . |
| 3,216,931 | 11/1965 | Dennis et al. ................... 134/25.1 X |
| 3,232,867 | 2/1966 | Abrams . |
| 3,355,385 | 11/1967 | Mackley ........................... 134/38 X |
| 3,420,774 | 1/1969 | Oehme . |
| 3,635,817 | 1/1972 | Zuckerman . |
| 3,700,591 | 10/1972 | Highley . |
| 3,748,285 | 7/1973 | Wiltsey et al. ................. 134/25.1 X |
| 4,097,306 | 6/1978 | Carman ........................... 134/25.1 X |
| 4,151,076 | 4/1979 | Reinhardt . |
| 4,221,778 | 9/1980 | Raghunathan . |
| 4,389,253 | 6/1983 | Nishimura et al. ............ 134/25.1 X |

FOREIGN PATENT DOCUMENTS

WO82/02379  7/1982  PCT Int'l Appl. .

OTHER PUBLICATIONS

McCutcheon, *Detergents and Emulsifiers*, 1978, p. 75.

*Primary Examiner*—Joseph Golian
*Attorney, Agent, or Firm*—John G. Premo; Donald G. Epple

[57] ABSTRACT

Described are processes for improving and maintaining the performance of particulate and othe types of water-treatment solids, especially particulate ion exchange resins, filter media, and adsorbents which have become fouled with organic contaminants, micro-organisms, and wasteproducts thereof.

24 Claims, 12 Drawing Sheets

TREATMENT AND PREVENTION OF FOULED WATER TREATMENT SOLIDS

INTRODUCTION

This application is a continuation of application Ser. No. 503,685, filed June 17, 1983, which in turn is a continuation-in-part of application Ser. No. 401,434, filed July 29, 1982, now abandoned.

Water softeners and demineralizers filter particulate matter from feed waters. These particles and the resins themselves also absorb naturally occurring and synthetic organic substances such as lignins, tannins, humates, oils, grease, water-soluble or dispersible polymers, etc., which may be excellent nutrients for bacteria or which may be direct foulants themselves. As the bacteria multiply, bacterial slime micro-organisms and waste products thereof can accumulate. These factors can drastically influence the performance of an ion exchange unit through shorter operating periods before regeneration, lowered resin capacities and poorer effluent water qualities. In addition, treated water containing micro-organisms and their waste products can present health problems, depending on the use of the water.

It has been found that the combined use of a non-ionic surfactant and a bio-dispersant can remove micro-organisms and waste products thereof, as well as organic foulants and oil and grease foulants from ion exchange resins and other water treatment solids. Tests indicate that a substantial improvement in water qualities and in ion-exchange resin capacities for both water softener and demineralizer resins are obtained by cleaning the resins with an effective amount of a non-ionic surfactant and a bio-dispersant as described below. A combination of these non-ionic surfactants and a bio-dispersants can also be used to maintain water-treatment resins in peak operating conditions by treating resins on a continuous and cyclical basis during the backwash cycle used in the regeneration process. The combined treating agent also provides a steady removal of organic anions that severely foul strong base anion exchange resins.

It has also been found that these surfactant/bio-dispersant combination products may also be improved by the addition of certain microbiocides.

REVIEW OF PROBLEM

Water softeners and demineralizer ion exchange resins can remove a variety of insoluble substances present in the feedwater requiring treatment by these resins. These insoluble substances can include insoluble iron salts, inorganic precipitates, silt, semicolloidal lignins, tannins, humates, natural and synthetic polymers, etc., plus oils or grease. These ion exchange resins and accumulated particles can also adsorb soluble organic substances. Most of the organic substances adsorbed on resins will ultimately influence the resin capacity and leakage rate of an ion exchange unit because of reduced rates of diffusion of ions into and out of contaminated resin beads.

In addition, the organic substances either adsorbed by the resin or filtered from the water can be excellent nutrients for micro-organisms. As these micro-organisms multiply, microbiological fouling in the ion exchange units does occur. Resin beads that are already coated with organic substances become coated with bacterial slime and other micro-organismic waste products which will further decrease the performance of ion exchange units. Shorter runs before regeneration and poor effluent water qualities are the usual observations. Removal of these contaminant mixtures by inorganic regenerants alone or with salt or caustic solutions is not successful.

As the organic foulants, bacteria, bacterial slime, and waste products continue to accumulate, the formation of large clumps enveloping large portions of the resin is found in the ion exchange units. These clumps will still further reduce the effectiveness of ion exchange units due to bed packing and channeling which can cause an early leakage of ions, i.e., can lead to early loss of capacity of these resin units. Field reports of reduced operating capacities being down to 25-50% of the original capacities are not unusual.

Micro-organisms are found in almost every water-treatment resin and their presence is not limited to any specific resin type. It includes water softener resins as well as cation and anion exchange resins used for the demineralizing of water. Bacteria is also found in home water softeners that are used on chlorinated water and on industrial and commercial water softener and demineralizer resins that were used to treat either surface waters or well waters. Even relatively clean-looking resin samples obtained from field samples show varying amounts of bacteria. In addition, the desirability of avoiding an excessive growth of bacteria is obvious if one considers that fever-causing toxins, i.e., bacterial waste products (pyrogens), can possibly be discharged from these units into the treated water supply.

There are two types of contamination problems. The first is surface fouling of the beads or particles wherein the contaminant is absorbed on the surface of the ion exchange material and continuous layering of contamination occurs. The second is ionic particle fouling wherein contaminants diffuse into the particles, and are bound to internal exchange site within the resin. In view of the listed problems, it is desirable for the operator of ion exchange units to remove the contaminants from the resin. An added incentive for doing so is, of course, the added expense of operating contaminated ion exchange units. For example, a unit that is down to 25% of its original operating capacity requires four times as many chemical regenerations, thereby increasing chemical and utility costs. The total cost for extra manpower needs, regenerant chemical costs, waste disposal costs, etc., can be extremely high, depending on the extent of organic contamination.

If ion exchange units could be maintained in a clean state to assure continuously optimum performance of the units, a major advance in the art would have been achieved.

INFORMATION DISCLOSURE

As further background and also as an information disclosure reviewing past attempts to solve the problems outlined above, the following U.S. patents are cited and incorporated herein by reference:

U.S. Pat. No. 3,442,798, issued May 6, 1969—describes concentrating organic combustibles in waste water on a carbonaceous surface adsorbent such as lignin charcoal, bone charcoal, powdered coke, powdered coal, activated charcoal, activated carbon, and the like, and then oxidizing an aqueous dispersion of the adsorbent containing the adsorbed combustibles.

U.S. Pat. No. 3,444,078, issued May 13, 1969—describes use of granular activated carbon in a waterpurification filter, a gravel bed underdrain, and recovery of activated carbon from water treated for human consumption.

U.S. Pat. No. 3,373,085, issued Mar. 12, 1968—describes recovery of phenol from coke-works waste water by adsorption on coking coal of the phenol in the waste water.

U.S. Pat. No. 3,578,589, issued May 11, 1971—removal from cooling water systems of accumulated deposits of scale, mud, silt, sludge, and other foulants by incorporating into water flowing through the cooling water systems of a non-ionic surface active agent and an acrylic or methacrylic acid polymer or water-soluble salt thereof.

U.S. Pat. No. 3,748,285, Wiltsey, et al., issued July 24, 1973—treated ion exchange resins with sulfonated detergents to provide clean resin beads.

U.S. Pat. No. 4,102,707, issued July 25, 1978, and U.S. Pat. No. 4,045,244, issued Aug. 30, 1977—detaching and dispersing microbiological products on support materials in contact with aqueous systems by adding to the aqueous phase a chemical having hydrogen-bonding characteristics and including water-soluble acrylamide polymers and epoxy compounds.

U.S. Pat. No. 3,996,131, issued Dec. 7, 1976—preventing fouling of reverse osmosis and ultrafilter membranes by coating the membranes with an adsorbant, with or without active carbon.

U.S. Pat. No. 4,260,504, issued Apr. 7, 1981—preventing formation of deposits on walls of heat exchangers wherein ethylene glycol/water circulates by mixing with the ethylene glycol/water about 0.3–5% w/w of a surfactant which is the production of addition of ethylene oxide and 1,2-propylene oxide or a monohydric alcohol, water, a diol or a triol, 60–90% of the fixed oxides being oxyethylene groups.

THE INVENTION

The invention is a novel process for improving, restoring, and maintaining the performance of water-treatment solids which are, or tend to become, fouled with organic substances, micro-organisms, and waste products thereof. This novel process comprises the cyclical treatment of these water-treatment solids with an effective amount of a non-ionic surfactant and a bio-dispersant.

The process of this invention can be improved by using a biocide in conjunction with the non-ionic surfactant and bio-dispersant. The biocide to be used in conjunction with the surfactant/bio-dispersant may be chosen from the group consisting of fatty quaternary ammonium salt biocides, bromonitrilo substituted biocides, isothiazoline, and oxidative biocides. The fatty quaternary ammonium salt biocides are best exemplified by alkyl dimethyl benzyl ammonium chloride biocide compounds. The bromonitrilo substituted biocides are best exemplified by dibromo nitrilo proprionamide. The isothiazoline biocides are commercial biocides manufactured by Rohm & Haas Co. and made available as KATHON 886, described in the Rohm & Haas product bulletin, DIC-76-3, May, 1977, which is incorporated by reference herein. The oxidative biocides are best exemplified by such materials as chlorine, bromine, hypochlorite salts or acids thereof, and hypobromous salts or acids thereof. The use of these oxidative biocides also has the potential advantage of using the oxidizing power of chemicals such as chlorine or sodium hypochlorite to decrease through oxidative mechanisms the molecular weight of hydrophobic compounds such as biological degradation products an biological waste products in such a way as to render these products more hydrophilic or dispersible in water.

The process of this invention can be applied to such water treatment solids as ion exchange resins, carbon adsorption packing, gravel and sand bed filters, ion exchange membranes, reverse osmosis membranes, and the like. Each of the above classifications of water-treatment solids are subject to becoming fouled with organic substances, soluble or insoluble iron, micro-organisms and their waste products, and natural organic substances derived from the waters used to feed the water-treatment solids of this invention. The preferred water-treatment solids which are most subject to improvement, restoration, and maintainence of performance are ion exchange resins which are used to remove ionic species from contaminated feed waters prior to these waters being used in steam generation and for other utility uses. These ion exchange resins can be chosen from gel-type cation resins, gel-type anion resins, macro-porous cation resins, and macro-porous anion resins. These processes may be used to improve, restore, and maintain the performance of these ion exchange resins by either of two processes or combination of these processes.

In addition, my invention provides an improved method of backwashing ion exchange resins which comprises conducting said backwash operations in the presence of a revitalizing agent which is present in the backwash cycle for the first 50% of the backwash operation. My invention includes backwashing treatment, within the zone of resin operation, and, if desired, separately therefrom, that is, the backwash treatment may be completed during normal resin operations or may be completed in separate operations when the resins would not be immediately placed back into an operative mode.

Process Parameters

The process which improves, restores, and maintains the performance of ion exchange resins and other water-treatment solids can initially be a process by which an effective amount of a combination of a non-ionic surfactant with a bio-dispersant is added to the resin which has become fouled with organic substances, micro-organisms and their waste products, in a batch clean-up type process. This batch process entails the addition of from about 50 to 2500 ppm (based on two bed volumes) of the active formulation to this fouled resin bed, preferably at elevated temperatures and for periods of time of at least 24 hours. These concentrations are based on a double volume of the resin bed or the ion exchange resin bed being treated. A preferred range is from 200 to about 1000 ppm of the active ingredients and the preferred treatment occurs at temperatures between 100°–180° F. for times of about 20–24 hours with airlancing (sparging) or rapid water circulation used for mixing and contact purposes.

When this batch system is used to treat water-treatment solids to remove fouling contaminants, it may be added along with and simultaneously with a fatty quaternary amine biocide such as an alkyl dimethyl benzyl ammonium salt. This quaternary amine biocide is used along with the surfactant and dispersant and may be present in an amount of from 1 to 50% by weight of the combined surfactant/dispersant formulation. The biocide is preferably used from 10 to 30% by weight based on the weight of the total mixture of the three biocide/- surfactant/bio-dispersant ingredients. The biocide, KATHON 886, described above, may also be used as an effective biocide along with the surfactant/dispersant formulation.

As was previously explained, the addition of an oxidizing biocide to the treatment mixture often is helpful in reducing the molecular weight of hydrophobic contaminants and micro-organism waste products. The oxidizing action of these biocides can tend to make hydrophobic contaminants hydrophilic and assist in their dissolution or suspension. This action tends to make these materials more readily removable during a wash and rinse cycle.

Prior to the resins being placed back into service, the resin bed is thoroughly washed with water to remove the last vestiges of the revitalizing agent formed by the combination of surfactant, bio-dispersant, and, optionally, biocide. This is normally completed during the remainder of the backwash cycle and during the regeneration sequences.

The second process, which is the preferred process, is a continuous cyclic treatment using the chemicals described above and below in the following manner. Each ion exchange resin goes through a typical cycle. Initially, the new, fresh resin is charged to the resin bed, wetted, and regenerated with regeneration chemicals. These chemicals are rinsed from the bed with wash waters and the ion exchange bed is then placed in operaton for the purpose of removing unwanted ionic species from feed waters requiring treatment prior to the use of these treated waters in steam generation or other utility applications. After a prescribed period of time, these ion exchange resins lose their capacity to remove required quantities of contaminating ionic species. At this point in time, the resins are backwashed by upflowing waters through the resin bed to expand the bed volume by about 50 volume percent for the purpose of discharging from the bed any dispersed contaminating and insoluble species which have a lighter density than the resin beads themselves. This backwash cycle normally is obtained at an upflow water flow rate of approximately 1 to 5 gallons/minute per cubic foot of resin contained in the resin bed.

Following this backwash cycle, the resin beds are allowed to settle and regenerating chemicals are added, flushed through the resin bed, and subsequently rinsed from the bed before the bed is back into operation.

The preferred process of our invention is the addition of the cleaning chemicals described above, and to be described more completely below, to the backwash cycle prior to addition of regeneration chemicals. The preferred process is the addition of these treatment chemicals to at least the first 10%, but no more than the first 50% of the volumes used to backwash the resins. We have called this the preventive maintenance mode of this process. Preferably, these treatment chemicals and cleaning solutions are added during the first 25% to 40% of this backwash rinse cycle. In practice, this means metering into the backwash waters during the 10 to 50% of the time allotted to backwash the resin at a relatively constant backwash flow rate, a relatively constant metered flow of the treatment chemicals using the non-ionic surfactant and bio-dispersant, and optionally the biocides. During the last 50% to 90% of the backwash, the chemical feed is no longer added and the remainder of the backwash waters are used to flush the treatment chemicals and contaminating residues from the system.

After the treatment chemicals are added and flushed from the resin bed, the resins so treated are then subsequently regenrated using standard regeneration chemicals and techniques.

When treating the resins in this preventive maintenance mode, the use of chemicals may be decreased in regards to the batch concentrations mentioned above. The combination products including non-ionic surfactants and bio-dispersants, optionally with or without addition of the biocides previously mentioned, may be added to the backwash cycle at a concentration ranging from about 10 ppm up to about 200 ppm of active ingredient based on backwash water volume. If this concentration range is maintained at every subsequent backwash cycle, the benefits of this invention are obtained. The further addition of from about 5 to about 200 ppm of the biocides mentioned above, preferably from about 10 to about 100 ppm of one or more of these biocide materials can improve the effectiveness of the surfactant/bio-dispersant treatment agent in many instances.

The Non-Ionic Surfactants

The non-ionic surfactants of this invention preferably have an HLB between 6 and 14. HLB stands for the hydrophilic lipophilic balance and is used as described in the publication by McCutcheon's Publications on Detergents and Emulsifiers, North American Edition and International Edition, 1974 Annuals, published by McCutcheon's Division, Allured Publishing Corporation, 45 N. Broad St., Ridgewood, N.J., USA. These non-ionic surfactants are preferably chosen from the group consisting of the non-ionic ethylene oxide adducts of alkylated phenols, the non-ionic ethylene oxide adducts of fatty alkyl alcohols, the non-ionic sorbitan esters, and the non-ionic alkyl aryl polyethylene glycol ethers. The preferred non-ionic surfactant is ethylene oxide adducts of alkylated phenols which have an HLB between 6 and 14. The most preferred non-ionic surfactant is an ethoxylated nonyl phenol containing about 9 moles of ethylene oxide.

The Bio-Dispersants

The bio-dispersants of this invention are preferably chosen from the group consisting of ethylene oxide condensates with propylene oxide adducts on propylene glycol having an HLBbetween 4–10 and a molecular weight between 1000–5000, non-ionic polyethoxylated straight chain alcohols, tris cyanoethylated cocodiamines, polyoxyethylene sorbitan ester/acids, non-ionic N,N, dimethyl stearamides, non-ionic amine polyglycol condensates, and non-ionic ethoxylated alcohols. Table I shows the types of chemicals which have been demonstrated to have bio-disperant properties.

TABLE I

| Evaluation of Compounds for Bio-Dispersancy 10 ppm with 1 hour contact Data Collected with Biometer | |
|---|---|
| Dispersant Chemical Type | % Biomass Change |
| non-ionic (polyol) condensate of ethylene oxide with hydrophobic bases (propylene oxide with propylene glycol) | 66.4% |
| non-ionic polyethoxylated straight chain alcohol | 58.5% |
| tris cyanoethyl cocodiamine | 47.3% |
| polyoxyethylene sorbitan ester of fatty and resin acids and alkyl aryl sulfonate blend (non-ionic) | 45.8% |

TABLE I-continued

Evaluation of Compounds for Bio-Dispersancy
10 ppm with 1 hour contact
Data Collected with Biometer

| Dispersant Chemical Type | % Biomass Change |
| --- | --- |
| cationic ethylene oxide condensation products of Duomeen T* | 35.8% |
| non-ionic N,N—dimethyl stearamide | 34.7% |
| monoamine (cationic) (cocomononitrile) | 31.3% |
| Low MW poly-acrylate (MW 1000–10,000) | 31.1% |
| non-ionic - amine polyglycol condensate | 30.0% |
| cationic - cocodiamine | 25.6% |
| non-ionic ethoxylated alcohol | 21.2% |

*Duomeen T = N—tallow-trimethylene diamine

The % biomass change in Table I was measured by exposing a slime mass previously grown and attached onto a surface to clear recirculating water at about 100° F. The water contained 10 ppm of each of the indicated biodispersants and it was allowed to recirculate at temperature for one hour. At the end of that time period, a biomass assay was made of water collected in a common basin by using a duPont 760 Luminescense Biometer which is described in the publication, *duPont 760 Luminescence Biometer*, published in December, 1970, and described in U.S. Pat. No. 3,359,973, which is incorporated herein by reference.

This Table shows the percent of clumped biomass dispersed by treatment with 10 ppm of the indicated dispersant. Although other dispersants were tested which had lower than 20% effectiveness, this data is not presented since any dispersant having less than 20% effectiveness in these tests would be found not to function adequately in this invention.

Revitalizing Agent—Surfactant/Bio-Dispersant Formulations

The weight of surfactant to dispersant in the treatment mixture can vary from about 0.1:10 to about 10:1 and preferably is from about 1:2 to 2:1. A 1:1 weight ratio has been found to be particularly effective.

Where a quaternary amine biocide is used along with the surfactant and dispersant, it can be present in an amount of from 1 to 50% by weight and preferably from 10 to 30% by weight based on the weight of the total mixture. These cationic biocides are preferably not used when cleaning cationic exchange resins.

The Biocides

The biocides of this invention are chosen from the group of fatty alkyl quaternary salt biocides, non-ionic bromo, nitrilo substituted proprionamides, the isothiazolines, and the oxidative biocides. The fatty alkyl quaternary salt biocides are exemplified by and are preferably an alkyl dimethyl benzyl ammonium chloride quaternary ammonium salt biocide. The non-ionic biocide may be preferably dibromo, nitrilo proprionamide, although this material is not stable under basic pH conditions, so its effective use is limited to neutral or mildly acidic conditions. The isothiazolines are best described as KATHON 886 and primarily manufactured by the Rohm & Haas Co. These biocides are described in a previously referenced product bulletin, made a part hereof.

The oxidative biocides are materials such as chlorine, bromine, hypochlorous acid, hypobromous acid and alkali metal salts of the hypochlorous and hypobromous acids. Herein, alkali metal salts means those salts containing sodium, potassium, ammonium, and rubidium cations.

Having described the batch process and the continuous cyclic preventive maintenance process; and having described the non-ionic surfactants and bio-dispersants of this invention; and having described the preferred biocides which may be used in combination with the non-ionic surfactants and bio-dispersants of this invention; therefore, the application of these chemicals in the processes for improving, restoring, and maintaining performance of water-treatment solids which are fouled with organic substances, micro-organisms, and waste products thereof, can now be best described by example.

EXPERIMENTAL STUDIES

1. Effect of invention on the performance of contaminated cation exchange resins.

The effect of the subject invention on the operating capacities and leakages of cation exchange resins contaminated with miscellaneous organic substances, bacteria, and bacterial waste products was observed in these tests. Two resins had very large amounts of a sticky, gelatinous mass coating the particles and in the form of greenish-grey flocks, and one resin contained a lesser amount of foulant. The first two resins had a foul odor while the third had only a faint, but still objectionable, odor. The materials used for the cleaning of these resins were a surfactant, namely, ethoxylated nonyl phenol (9 mol.) and a bio-dispersant, namely, polyoxypropylene polyoxyethylene condensate (cloud point 32° C.); and a quaternary amine, namely, alkyl dimethyl benzyl ammonium chloride. In part, the quaternary amine may act as a surfactant solubilizer.

In order to determine the effectiveness of removing organics, bacteria, and bacterial waste products from resins by the subject process, the quantities of chemicals and reaction times selected were higher than actually needed.

Test No. 1, Strong Acid Cation Resin

This resin contained substantial amounts of large and medium-sized greenish-grey flocks, and the beads were fairly evenly coated with a gelatinous-type mass that felt slimy to the touch.

Test Conditions:

A 300 ml quantity of the resin was added slowly to a one-inch Lucite tube, with a minimum of water between additions of each sample portion. This assured that the slime-like flocks were evenly mixed throughout the resin column. The total bed height was 22.5 inches. The resin was then allowed to stand unattended for four days. After this time, the resin was lifted by backwashing. A solid, cylindrically shaped mass moved upwards like a piston, and only about 30–40% of the total resin beads separated from this solid mass. After 15 minutes, the attempt to backwash the resin was discontinued. The water removed by backwashing was 800 ml. This water showed a total bacterial count of between $10^6$ and $10^7$ per ml, as determined with the Orion Easicult Dip Sticks.

Test Water:

A 30 gpg (grains per gallon) total hardness test water was prepared by adding 62.6 g $CaCl_2$, anhydrous, 70.2 g $MgSO_4.7H_2O$, and 28.35 g of $NaHCO_3$ to 50 gallons of D.I. water. The final water then contained 526 ppm of total hardness, at a ratio of two-thirds calcium and one-third magnesium, plus 150 ppm $NaHCO_3$.

This test water was passed through the unit at a flow rate of 80 ml per minute, or the equivalent of 2 gpm per cubic foot of resin, until a hardness leakage of one grain per gallon (gpg) was obtained.

Test 1-A, Resin Backwashed Only:

The resin was then regenerated with the equivalent of 6 pounds of NaCl per cubic foot, or 270 ml of a 10% salt solution per 300 ml of resin. The resin was then rinsed with one bed volume of D.I. water at a flow rate equivalent to the regenerant flow. At this point the hard water was passed through at 80 ml per minute.

The hardness leakage and pressure drop data are shown in FIG. 1. The average pressure drop through the resin unit was 4.5 PSI.

Test 1-B, Resin Airlanced and Backwashed:

The water above the resin used in Test 1-A was drained to bed level and airlanced for about three minutes with compressed air at a flow rate that barely retained the 22.5 inches of resin within the 55-inch-long tube. The resin was then backwashed with D.I. water at a flow rate to obtain a "normal" expansion of the resin of 50 percent, until the effluents were free of any debris. This required about 35 minutes of backwashing. During this time, a considerable amount of a fluffy, brown and green colored material was rinsed out. The particles ranged from about 0.5 to 2 mm in size. The amount backwashed was about 50 ml. The particles felt quite sticky. A microscopic examination showed primarily translucent particles.

The test water was then passed through the unit as in Test 1-A.

The results are shown in FIG. 1. The average pressure drop across the unit was 1.5 PSI.

Test 1-C, Resin Treated with a Surfactant, Bio-dispersant and Biocide.

The resin used in Tests 1-A and 1-B was backwashed for 10 minutes, then one liter of a mixture of 1000 mg ethoxylated nonyl phenol (9 mol.), 1000 mg polyoxypropylene polyoxyethylene condensate (cloud point 32° C.), and 500 mg of alkyl dimethyl benzyl ammonium chloride (as 50% solution of the quaternary amine) was passed through the resin slowly at a temperature of 110°–130° F. for one hour. The solution was reheated and passed through again for one hour. The last part of the solution was left in the resin unit over a 48 hour period. Afterwards, the resin was backwashed with D.I. water for 45 minutes, i.e., until the backwash effluents were clear. The debris removed during this time was of a very small particle size, light enough to require about two hours to settle in the collection vessel. A microscopic examination of these particles, which were light tan in color, showed translucent, gelatinous particles of various shapes and thicknesses. The resin was then regenerated and rinsed as described in Tests 1-A and 1-B. The capacity and leakage properties of the treated resin were determined under identical conditions used for the backwashed, or airlanced and backwashed, experiment. A pressure drop could not be detected by the pressure gauge used.

The results for leakages and capacity are shown in FIG. 1.

As can be seen in the curves in FIG. 1, a significant improvement in the capacity and the hardness leakage was obtained through treatment with the surfactant, bio-dispersant and biocide. On backwashing the resin, it was found to be loose and without any clumps. The beads separated nicely. The backwash-effluents showed a moderate amount (about 3 ml) of small, tan-colored flocks that come off very easily. Some flocks (1 ml) remained on top of the resin, along with some fiber that came originally with this customer sample.

The supernatant of this sample showed zero bacteria when tested with Orion Easicult Dip Sticks.

Test No. 2, Water Softener Resin

This resin was contaminated with unusually large amounts of loose, large-sized flocks, and the resin beads were coated with a gelatinous-looking coating that felt slimy to the touch. The coating was of a greenish-grey color.

Test Conditions:

A 300 ml quantity of this resin plus loose contaminants were placed into a one-inch tube with a minimum of water between addition of each resin portion. This assured that the slime-like flocks were evenly mixed with the resin. The resin was left in the unit for four days. After this time, an attempt was made to backwash the resin. It moved upwardly in the tube in a single piece and would not loosen by alternately turning the water flow on and off.

Test 2-A, Airlanced and Backwashed:

The water was drained to bed level and the bed was airlanced for about five minutes while the thin plastic tube used to introduce the air was moved up and down repeatedly. The resin was then backwashed for about 45 minutes until the effluents were clear. The first 500 ml of backwash water showed a total bacteria count of $10^7$, as measured with an Orion Easicult Dip Stick test method. The total amount of solids backwashed was approximately 35 ml. This material settled to about 25 ml in two weeks. The resin volume was reduced by about 5 ml, to 325 ml total. A microscopic examination of the greenish-grey flocks removed by backwashing showed translucent, gelatinous particles of uneven shapes and sizes. The resin was regenerated with 298 ml of 10% NaCl, or six pounds NaCl per cubic foot of resin. The resin was then rinsed, and test water was passed through as described in the experiment of Test 1.

Figure 2:
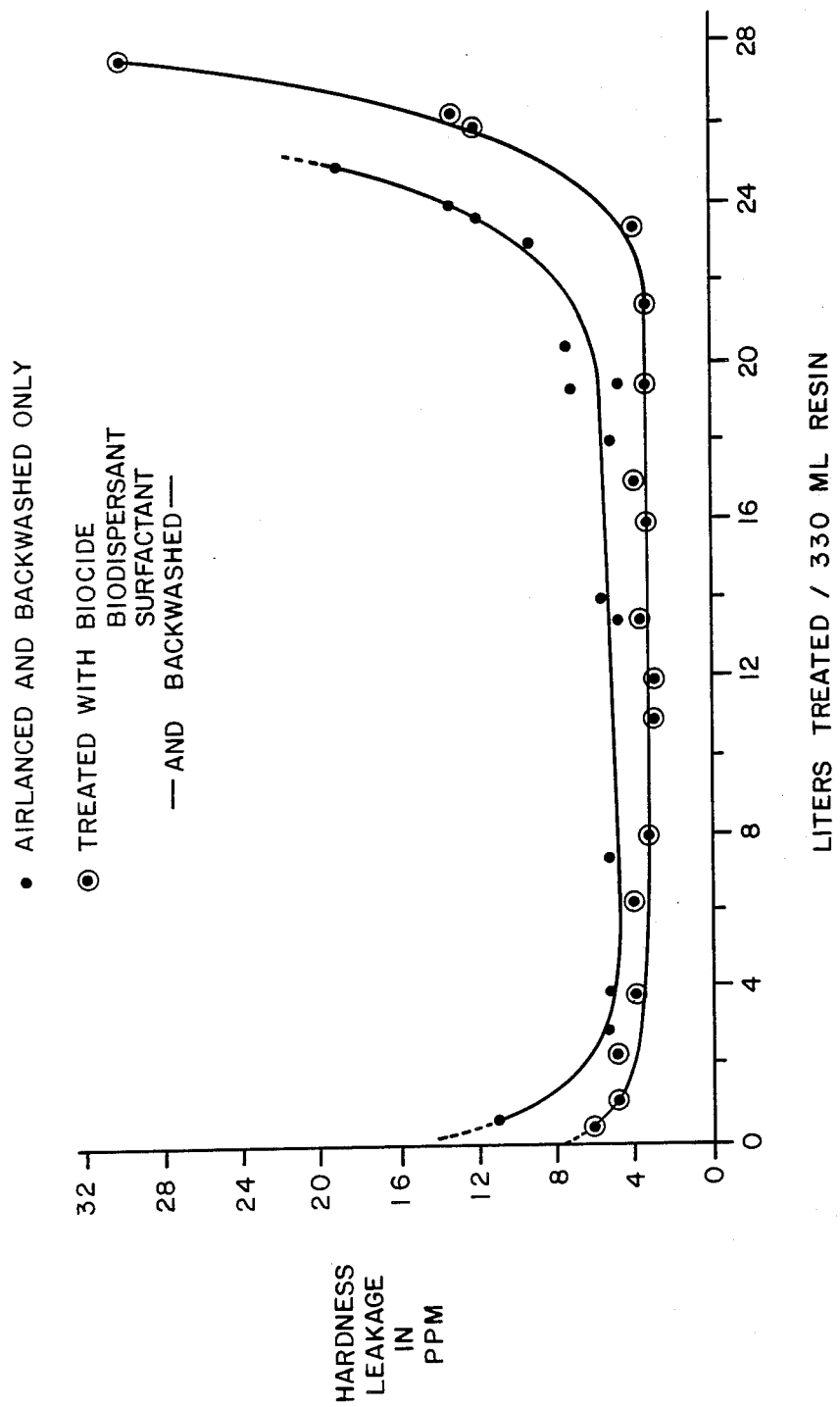

The capacity and leakages are shown in FIG. 2.

The average pressure drop in the unit was 0.5 PSI.

Test 2-B, Resin Treated with a Surfactant, Bio-Dispersant and Biocide

The resin used in Test 2-A was treated with 500 ml of a solution containing 500 mg of ethoxylated nonyl phenol (9 mol. of EO), 500 mg of polyoxypropylene polyoxyethylene condensate (cloud point 32° C.), and 250 mg alkyl dimethyl benzyl ammonium chloride (as 50% solution of the quaternary amine), at 110°–130° F. for three hours by repeatedly reheating the solution and passing it down flow through the resin. One bed volume of this solution was left in the unit overnight. The resin was then backwashed to a 50% expansion for 45 minutes until the effluents were clear. About 20 to 25 ml of a light brown substance in the form of fine flocks were removed. The flocks were smaller than 1 mm diameter in size.

The supernatant of the resin showed zero bacteria when tested with the Orion Easicult Dip Stick.

The resin was then regenerated as in Test 2-A. The used regenerant was collected and showed a light yellow to tan color. Foaming of the regenerant effluents was also noted. The resin was then rinsed with 330 ml of D.I. water at the regenerant flow rate, then fast-rinsed with test water. The test water was then passed through the resin under identical conditions as used in Test 2-A (at 2 gpm/ft$^3$).

The capacity and leakage data are shown in FIG. 2.

A pressure drop could not be measured with the pressure gauge used.

Foaming of the effluents was noted until 10½ bed volumes, i.e., 3.5 liters of test water, were passed through the resin. At this point, also, no odor of any kind was noted. At the end of the tests, the resin was backwashed by alternately lifting and settling the resin. The resin still showed some clumping, although much less than originally. But this test indicated that, while a significant cleaning was achieved, not all of the contaminants were removed. This resin was obviously so severely contaminated that a more drastic cleaning or repeated cleaning is necessary. A microscopic examination showed dramatic differences in the appearance of the resin, i.e., the cleaning had removed a large portion of the original contaminants. This is also indicated by the improvement in the capacity and hardness leakage of the resin, as shown in FIG. 2.

Test No. 3, Water Softener Resin

This resin was only lightly contaminated with loose, light brown flocks and some coating of the beads.

Test Conditions:

250 ml of resin plus the small amounts of flocculant contaminant were placed into a one-inch tube, resulting in 20.5 inches bed height. This resin was left in the unit for four days. The resin was then lifted by a brief backwash. Several small clumps were observed that did not break up as the resin slowly sank through the water to the bottom of the tube.

Test No. 3-A, Airlanced and Backwashed:

The water was drained to bed level and the resin was airlanced for five minutes by simultaneously moving the thin air tube up and down in the resin bed. The resin was then backwashed for 35 minutes, i.e., until the effluents were clear. The amount of a fluffy, very small-sized material was about 7 ml when freshly collected. This amount settled to 4–5 ml after a week. The first 500 ml of backwash water showed a total bacteria count of $10^5$ to $10^6$, as measured by the Orion Easicult Dip Stick test.

The resin was regenerated with 225 ml of a 10% NaCl solution, or six pounds NaCl per cubic foot of resin. The resin was then rinsed and exhausted with test water under identical conditions as used in all previous experiments.

Figure 3:
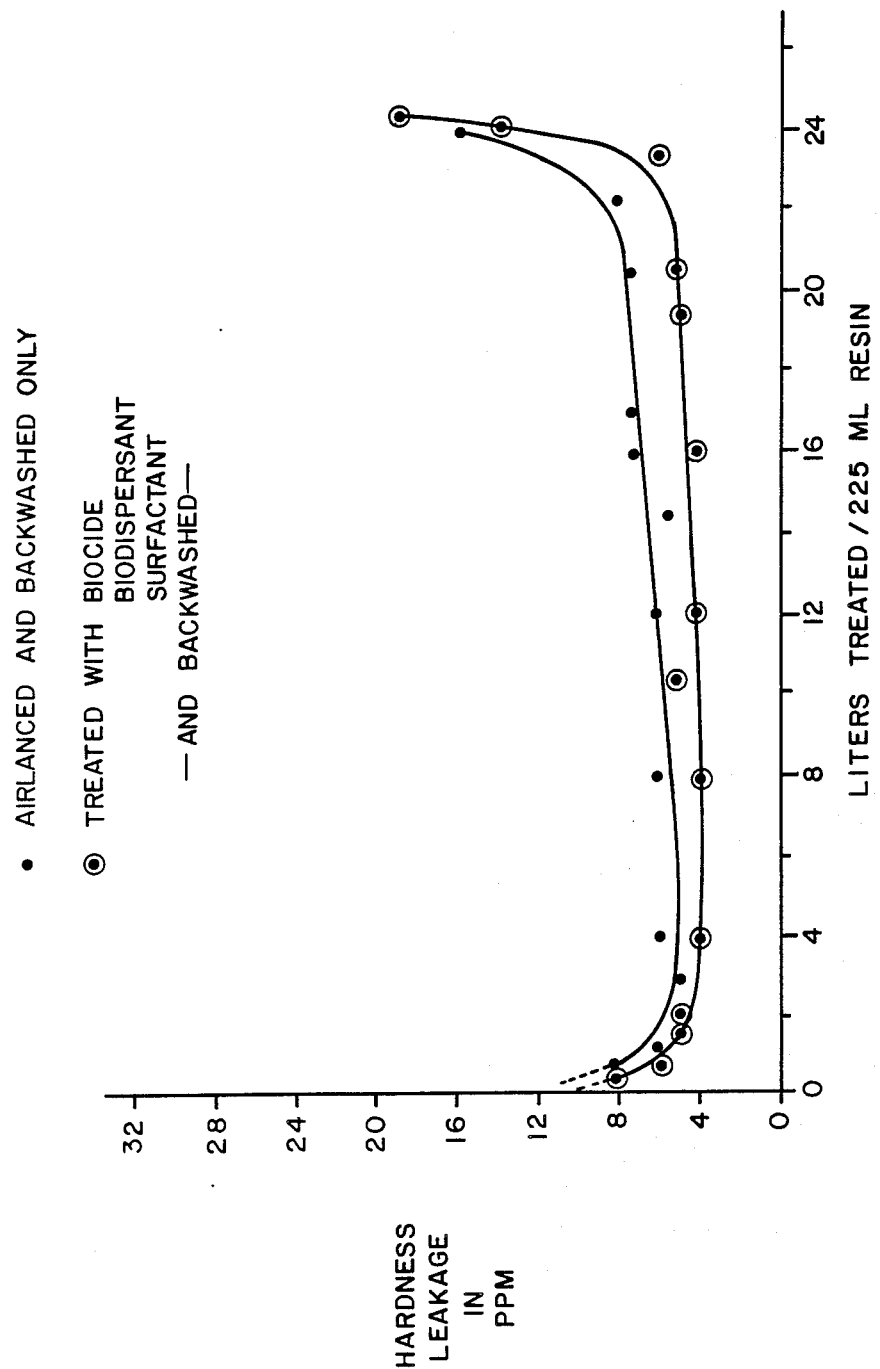

The capacity and leakages obtained are shown in FIG. 3.

There was not enough pressure drop to measure it with pressure gauge used.

Test 3-B, Resins Treated with a Surfactant, Bio-Dispersant, and Quaternary Amine:

The resin that had been used in Test 3-A was treated with 500 ml of a solution containing 500 mg ethoxylated nonyl phenol (9 mol.), 500 mg polyoxypropylene polyoxyethylene condensate (cloud point 32° C.), and 250 mg of alkyl dimethyl benzyl ammonium chloride (as 50% solution of the quaternary amine), at 110°–130° F. for three hours by repeatedly reheating the solution and passing it down flow through the resin. As in Test 2-C, one bed volume of the solution was left in the unit overnight. The resin was then backwashed until the backwash water was clear, which required about 45 minutes. The total amount of a tan-colored, flocky, fluffy material removed was about 3 ml. A microscopic examination showed translucent, gelatinous particles of a small particle size and of various shapes and thicknesses. The supernatent of the resin was free of bacteria, as measured by the Orion Easicult Dip Stick test. The resin was then regenerated, rinsed, and exhausted with test water under conditons identical to all previous tests. The spent regenerant showed a light yellow color.

The capacity and leakage obtained are shown in FIG. 3.

Foaming of the effluents stopped at about 2.5 liters of test water passed through, or the equivalent of 11 bed volumes.

The capacity of the resin that was airlanced and backwashed only was close to the available capacity of this particular resin sample, i.e., about 23.0 liters of the test water was softened by the 225 ml of resin. The chemical treatment with the surfactant, bio-dispersant and quaternary amine, therefore, had little to improve in terms of capacity ($\sim 1$ liter test water. was treated additionally). The improvement in water quality, however, was significant. On the average, a reduction from 6 ppm total hardness leakage obtained with the resin as received, to 4 ppm with the chemically treated resin, as can be seen in FIG. 3. The results obtained with this resin are particularly interesting when one considers that this resin was fairly new (10 months old) and had only a relatively small amount of bacteria and miscellaneous organic debris coating the resin and in the form of loose substances in the supernatant.

Test No. 4

In this test a commercial demineralizer system having a history of rapid losses in operating capacity was treated in accordance with the subject invention. The decrease in capacity had required frequent resin replacement which represented a major operating cost. The cation resin had to be replaced every three years; the weak resin, every eleven months; and the strong base resin, every eighteen months. The diminished resin life was due to rapid fouling with natural organics, bacteria, algae, and synthetic polymers. The adverse effect of the surface foulants on the cation and weak base resin units was particularly evident.

The purpose of the test was to determine whether a combination of a bio-dispersant and a non-ionic surfactant could remove sufficient foulants to restore the system to a useful capacity. In this test, NaOCl was added as an oxidizing agent, a solubilizer, and an inorganic oxidative biocide.

In the test, water from a lagoon that collects natural surface run-off water was pumped to a water treatment plant where from 1 to 5 ppm of a synthetic polymeric coagulant was added. The water was passed to a filtration unit to remove particulate material and was then passed through the demineralizer system consisting of four demineralizer trains, each train containing 400 cubic feet of cation resin, 225 cubic feet of weak base resin, and 150 cubic feet of strong base resin. Resin replacement of two of the four trains had been scheduled due to lowered capacities. These two trains were treated in accordance with the subject invention in the following manner:

Cleaning of Demineralizer Trains 1 and 2

Each unit of the two demineralizer trains was cleaned separately.

1. Cation Unit of Train No. 1: (400 cubic feet)
Dosage (1) 2500 ppm of a mixture of a surfactant and a biodispersant. The surfactant was a non-ionic liquid nonylphenoxy polyethoxy ethanol having an HLB of 13.3.

The bio-dispersant was a liquid non-ionic block copolymer of propylene oxide and ethylene oxide having an HLB of 7.0.

(2) 250 ppm $Cl_2$ added as bleach, or 2.5 gallons of 18% NaOCl per unit.

The unit was air rumbled through the backwash line every hour for four hours, then left standing overnight. Foaming did not occur, possibly due to the unusually large amount of particulate matter loosened up during the cleaning. The next morning the unit was backwashed at 300 gallons per minute for two hours. At this point, the discharge water was clear. Foaming was no longer observed after 30 minutes. Small particulate matter still came off in large quantities. The surface coating of the resin particles accepted Alcian Blue dye to an extent that about ¼ of most particles were coated with dyed substances. This indicated the presence of polysaccharides, i.e. biological waste products.

2. Weak Base Unit of Train No. 1: (225 cubic feet)
Dosage:
(1) 2500 ppm of the mixture described above, 2 bed volumes, or 4 gallons per unit.
(2) 250 ppm $Cl_2$ added as bleach, or 1.4 gallons of 18% NaOCl per unit.

Once again, the unit was air rumbled every hour for four hours. Moderate foaming occurred, and air rumbling was stopped when the foam reached the top of the unit. The unit was left standing overnight, then backwashed for 1¾ hours until no more particles or foaming was noticed in the effluent. The backwash water cleared up much faster than the cation unit, i.e. less particles were removed.

3. Strong Base Unit of Train No. 1: (150 cubic feet)
Dosage:
Same solution strength. Total amount added was 2.5 gallons of the mixture described above and 0.95 gallons of 18% NaOCl.

This unit contained almost no loosened particles and foamed during air rumbling and during backwashing. The addition of a chemical defoamer to the waste water was very effective in preventing foaming in the sewer lines.

4. All Resin Units of Train No. 2:

The conditions described for Train No. 1 were employed in treating Train No. 2 and the same amount of chemicals were used.

The reaction time for the cleaner, however, was maintained at four hours. The cation unit was more severely fouled than that of Train No. 1. Thus, a backwashing rinse of 2½ hours was required versus 2 hours for the cation unit in Train No. 1.

EXAMPLE 1

Preventive Maintenance Treatment of Demineralizer Train No. 1

A preventive maintenance dosage of 20 ppm of the mixture of surfactant and dispersant used in the above tests was fed into the backwash water during approximately the first 10 minutes of each backwashing of the cation, weak base and strong base units. The product appears to be rinsed from the units during the remaining backwash, i.e., 20 minutes additional, plus the normal regeneration and regenerant rinse. The "final" rinse water taken during the last two minutes of rinse showed a surface tension equal to the raw water influent.

After several backwash cycles using this preventative maintenance program, the defouling treatment restored the trains to their maximum available operating condition. The length of the run of Train No. 1 was increased from 485,000 gallons to 1,070,000 gallons, and an increase from 870,000 to 1,050,000 gallons for Train No. 2 was achieved. A resin analysis showed only 81% of the original capacity remaining, i.e., all of the available capacity of this used resin was restored.

Collected data after five months of operation established that the preventive maintenance treatment of Train No. 1 reduced the decrease in the lengths of the runs to about only 12 to 15%, while Train No. 2 showed a rapid decrease of 45% in the lengths of the runs, i.e., the relative amounts of water treated.

This trial illustrates that the preventive maintenance program is most effective. The demineralizer Train No. 1 was initially cleaned and treated with a 1:1 weight ratio mixture of surfactant and bio-dispersant plus chlorine. It was then continuously and cyclically treated with the same mixture of non-ionic surfactant and bio-dispersant to provide optimum operating capacities and excellent low leakage characteristics, typical of clean demineralizer resins. In contrast, the demineralizer Train No. 2 that was effectively batch cleaned but not further treated with a cyclical prevention and maintenance program showed a decrease in its operating characteristics.

The success of removing the surface contaminants was probably due in part to the combination of surfactant, dispersant, and chlorine as an oxidative biocide. It is also believed that chlorine can interact with any contaminant polymer chain at branch sites causing breakage of the chain, resulting in a lower molecular weight and the formation of a more water soluble polymer residue. The alkalinity provided by the use of the bleach may also be beneficial in converting the polymer to its more water soluble sodium salt form.

EXAMPLE 2

2. Improving the performance of a Contaminated Strong Base Anion Exchange Resin

The following tests were made to study whether it is feasible to improve the performance characteristics of fouled anion resins through the use of a surfactant and bio-dispersant as an additive to the currently used cleaning solution, i.e., a mixture of salt and caustic. Ultimately, it is hoped to provide sufficient evidence for the usefulness of such components to help maintain anion resins in peak operating condition, i.e., to prevent the accumulation of organics instead of allowing the resin to become fouled and waiting until the cost of operating a unit is so high and the water quality produced is so poor that the plant manager faces a serious operational problem.

The resin selected was a customer sample that had been received recently. The customer had experienced both poor water quality and high pH with this resin. This sample contained a moderate amount of tan-colored, flocky particles of varying shapes and sizes, and the resin itself was coated with moderate amounts of a slimy substance. The sample had a foul odor that is not characteristic of new anion exchange resins. The water surrounding the resin particles had a total bacteria count of about $10^7$, as measured by the Orion Easicult test, indicating the resin environment was microbiologically fouled and comtaminated.

The sample showed only 79% of its original total capacity and 67% of its original salt splitting capacity. It contained 10% broken beads, was contaminated with 12 g Fe and 26 g Si per cubic foot of resin, and was also fouled with large amounts of deeply colored organic substances.

A. Capacity and Leakage Tests Before Chemical Treatment

Two 40 ml samples of this resin were placed into a 50 ml burette, exhausted with water containing 585 ppm hydrochloric acid calculated as $CaCO_3$, to a 50 mmhos (micromhos) leakage. The resin was then regenerated with five pounds NaOH per cubic foot of resin, rinsed and exhausted with the test water of 585 ppm total hydrochloric acid as $CaCO_3$.

One sample (column A) showed an effluent having a conductivity of 10 to 21 micromhos. The other sample (column B) resulted in water having a conductivity of about 25-30 mmhos but, at the end of the cycle, it was noted that this sample contained slightly more debris than the first sample.

B. Capacity and Leakage Tests After Chemical Treatment

Column A was treated with the normally recommended treatment of 10 pounds NaCl and 1 pound NaOH per cubic foot of resin, applied as a 10% solution at 140° F. for three hours. The actual amount used was 60 ml of solution per 40 ml of resin.

Column B was treated with a mixture of 60 ml of the above solution, diluted to 110 ml total with an aqueous solution of 50 mg ethoxylated nonyl phenol (9 mol.), 50 mg of polyoxypropylene polyoxyethylene condensate cloud point 32° C. and 25 mg of alkyl dimethyl benzyl ammonium chloride, a quaternary amine biocide. Treatment time was three hours, at 140° F.

Both columns were left without heat overnight with enough of each treatment solution surrounding the resin beads. The resin samples were then rinsed with 0.2N HCl followed by water, regenerated, rinsed, and exhausted, as under A. The accumulated treatment effluents were both very deep red-brown in color. The water quality obtained, however, was quite different. The resin treated with the surfactant, bio-dispersant, and biocide mixed with salt and caustic produced a water with a conductance of about 5 to 10 mmhos less than the column treated with the surfactant, etc., and provided a water quality of about 6 mmhos for about two-thirds of the test, while the resin treated without these additives resulted in a water quality of about 15 to 20 mmhos throughout most of the test, with about 5% of the run giving the water quality of 8 mmhos.

The initial one-third of the water treated with both resins showed a light tan color, more color was noted with the resin treated with surfactants, etc. This seems to substantiate the appraisal that a strong base resin that has been allowed to accumulate organics may very likely never be completely cleaned, due to the low mobility of large molecular weight organics. In other words, a resin that has accumulated these substances over a long time period cannot be expected to be completely cleaned in the relatively short time period set aside for cleaning. The positive improvement noted here, however, provides proof of the validity of the concept of using surfactants and bio-dispersants to help remove organics from anion resins that are otherwise difficult to displace from the resins. In addition, these results indicate further that the components used are excellent candidates for preventing the accumulation of organics on anion exchange resins.

EXAMPLE 3

3. Product Preparation

A total of four products were prepared. The products included a biodispersant (polyoxypropylene-polyoxyethylene condensate prepared as described in U.S. Pat. No. 2,674,619, which is incorporated by reference) and a surfactant (ethoxylated nonyl phenol [9 mol. of EO]), with or without a quaternary amine (alkyl dimethyl benzyl ammonium chloride) biocide.

All products were formulated at 50% solutions in water. The individual components were mixed at 60°–65° C. (140°–150° F.) without any difficulty. At lower temperatures, the mixing is somewhat more difficult; the viscosities of the solutions during mixing being such that considerable time was needed to attain a uniformly mixed solution. The preferred mixing order was: water surfactant followed by the dispersant, and finally the quaternary amine biocide.

| Product No. | Product Components and Mix Order | | | | |
|---|---|---|---|---|---|
| | Water | Surfactant | Dispersant A | Dispersant B* | Quaternary Amine |
| CX-29 | 50% | 20% | 20% | — | 10% |
| CX-30 | 50% | 25% | 25% | — | — |
| CX-31 | 50% | 18.2% | — | 18.2% | 13.6% |
| CX-32 | 50% | 25% | — | 25% | — |

*Dispersant B is of the same type as Dispersant A except that it has a cloud point (32° C.) which is 8° higher than that of Dispersant A.

All of the products prepared are colorless, clear, and somewhat viscous solutions. They solubilize readily in water at any concentration and at any temperature.

These CX-number products were subjected to stability tests at 120° F., 75° F., 32° F. and 0° F. After two weeks, no change was observed except that the products froze at 0° F. Upon thawing, a complete freeze-thaw recovery was observed.

The following surfactants have been used with success in the process:
Makon 10—a non-ionic, liquid alkylphenoxy polyoxyethylene ethanol.
Surfonic N-85—a non-ionic, liquid nonylphenoxy polyethoxy ethanol.

EXAMPLE 4

The effectiveness of our combined non-ionic surfactant and bio-dispersant program for maintaining the capacities of ion exchange resins was tested at a plant in southern United States. One cation and two anion demineralizer units were fouled by water containing organic substances from natural sources and also possibly from a sewage treatment plant upstream. The cationic exchange resins showed a surface coating with undefined organics, bacterial slimes, and with detection of micro-organisms. The anionic exchange resins were severely fouled with dark brown substances thought to be lignins and tanins. Also, substances of an oily or greasy nature were detected on the anionic exchange resins causing clumping of the resin particles. All three units were treated with a combination of my preferred non-ionic surfactant and bio-dispersant in combination with sodium hypochloride used both as an oxidizing agent as well as a biocide.

Water passing through the demineralizer units ranged in temperature from 85° F. to about 95° F. during the test. The water contained substantial amounts of natural organics plus the discharge from a sewage treatment plant upstream. Although no massive analytical attempt was made to identify each of the organic contaminants, a reasonable estimate of these contaminants could include the presence of tannins, lignins, fatty acids, microbiological organisms, and the waste products thereof.

The cation exchange unit had been charged with Permutit QB and was tested as having a total exchange capacity equal to 1.55 milliequivalents per milliliter which was about 77% of the original ion exchange resin capacity. The anion exchange unit #1 was charged with Dowex 11 which had a salt-splitting capacity equal to 0.44 milliequivalents per milliliter or about 34% of the original capacity, was tested as having 0.45 milliequivalents per milliliter of weak base groups compared to no weak base groups detectable on new, fresh resin, and had a total exchange capacity of 0.89 milliequivalents per milliliter which corresponded to about 68% of the original capacity.

The anionic exchange resin unit #2 was charged with IRA-402 from Rohm & Haas which tested as having 0.38 milliequivalents per milliliter salt-splitting capacity, equal to about 29% of the original capacity. The weak base capacity of this resin was tested as having 0.71 milliequivalents per milliliter although no weak base capacity is detectable on fresh new resin. The total exchange capacity of this anion unit resin was 1.09 milliequivalents per milliliter which tested out as 84% of the original fresh new resin capacity.

Treatment of the cationic exchange resins with Alcian Blue Dye indicated the presence of polysaccharides such as bacterial slimes, wood sugars, and slime-forming bacteria.

As stated above, the anionic resins were dark in color, formed small clumps, and had white coating which dissolved only with prolonged contact with hot caustic. Again, although no analyses were run, this hot caustic dissolution would be typical of silicate deposits which would tend to form when soluble silicates are passed over an acidic resin, for example, a resin with high percentages of weak base groups.

Each of the three units were treated initially with a batch treatment containing 2500 ppm of a combination product which, in turn, contained the preferred non-ionic surfactant and bio-dispersant of this invention. In addition, 250 ppm of chlorine was added (as sodium hypochloride) based upon 2 bed volumes of water. The treatment of the anion resin units also included the addition of 100 ppm of a quaternary amine biocide.

The units were opened, the water drained to about 6" above the resin, and the chemicals listed above were added. Water temperatures were between about 85° F. to 90° F. during the addition of these chemicals. The units were airlanced immediately and then every hour for four hours. Foaming inside the units was excessive and airlancing was stopped when foam appeared at the top of each of the resin bed units.

Each of the units were then backwashed to overflow until the effluents were free of particulate matter and little or no foaming was observed. This required about 45 minutes for the cation resin bed units and about 75 minutes for each of the anion units. All three units were then each regenerated in their normal manners.

The preventive maintenance treatment was started immediately following the batch cleaning of cation unit #1 and also of anion unit #1. The anion unit #2 was left without any further treatment for the benefit of being able to compare the performance of this unit with the anion unit #1, thereby comparing two identical units with the ability to observe the effect of periodic maintenance treatment vs. the performance of the unit only being exposed to a batch cleaning treatment.

The preventive maintenance program consisted of feeding 80 ppm of a 25% aqueous solution of the combined product of a non-ionic surfactant with a bio-dispersant for the first 10 minutes of each backwash followed by a 20 minute continuation of backwashing with standard clean waters and followed subsequently by normal regeneration. Table II presents data which compares the results obtained with these online field tests.

TABLE II

| | OPERATING CAPACITIES BEFORE AND AFTER TREATMENT | | |
|---|---|---|---|
| Days | Cation Unit No. 1 Cleaned, plus Preventive Maintenance | Anion Unit No. 2 Cleaned Only | Anion Unit No. 3 Cleaned, plus Preventive Maintenance |
| Day 1 | Cleaned unit plus preventive maintenance started | Cleaned Unit No further treatment | — |
| Day 2 | 56,000 gallons over meter setting | 37,000 gallons less than meter setting (silica leakage) | 18,000 gallons less than meter setting (silica leakage) |
| Day 3 | — | — | — |
| Day 4 | — | 42,000 gallons less than meter setting | Cleaning plus preventive maintenance started |
| Day 5 | 30,000 gallons over meter setting | — | — |
| Day 6 | — | Regeneration before leakage —30,000 gallons less than meter setting | 20,000 gallons left on meter (silica leakage) |
| Day 7 | 24,000 gallons over meter setting | — | 18,000 gallons left on meter (silica leakage) |

Careful observation of the tabular data indicates the effects of cleaning and the effects of the preventive maintenance program. Plant operating personnel were requested to monitor these units to their true end-point, that is, silica leakages for anion units and a decrease in the free mineral acidity for the cation unit. Normally, this plant operated its demineralizer units by automatic water meter shut-off devices. When a predetermined number of gallons of water had passed through the units, the units were automatically backwashed, regenerated, and rinsed prior to exposure of water requiring this treatment. In the case of the anion units, normal runs went well beyond the leakage of silica. Our tests indicated that the anion units lost no more capacity, but cleaning in the manner of our batch system did not increase the operating capacity. This is not too surprising since the data on the original resins indicated that these resins had deteriorated dramatically to such an extreme that a continuation of this trial was questionable.

However, the preventive maintenance program did indicate that the extent of fouling was reduced beyond the reductions achieved using the batch cleaning process.

The results of this evaluation also indicated that the surface coating fouling the cation resin was removed and that the throughput for this resin was increased from 240,000 gallons per run to 270,000 gallons per run. A subsequent application of the preventive maintenance dosage of our invention assisted in maintaining this extended throughput increase.

The ionically fouled anion resins showed no change in throughput initially. However, even with these relatively short-term tests, these ionically fouled anion resins did show no further decrease in operating capacities and characteristics.

The preventive maintenance program continued over a time period of about 14 months. Over this period of time, the run lengths on the severely fouled strong base anion resins dramatically improved from approximately 170,000 to 227,000 gallons and have been maintained at this level for the last 4 of that 14 month period. The water quality of the total demineralizer train was dramatically improved as well.

Figure 4:
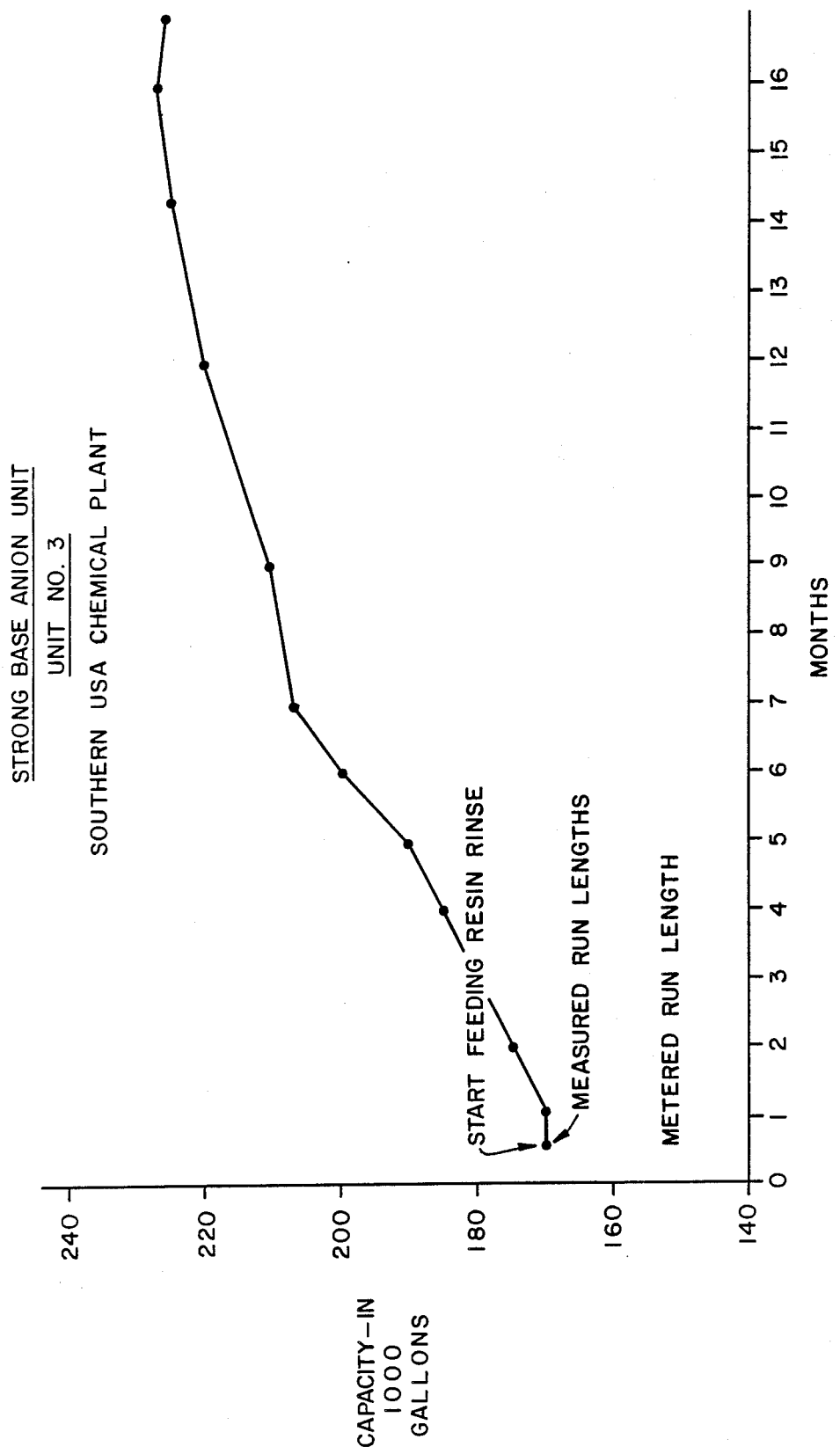
Figure 5:
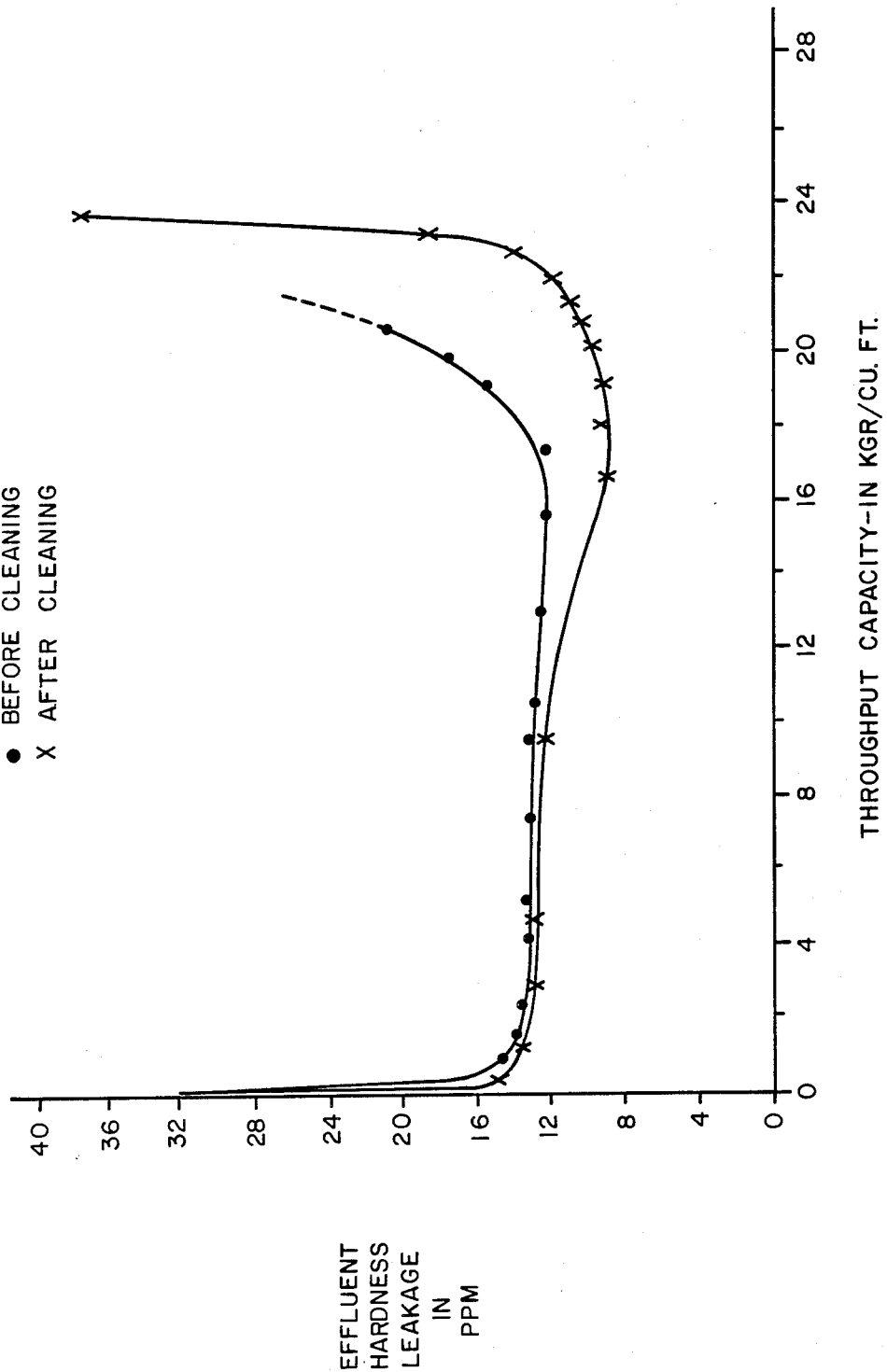
Figure 6:
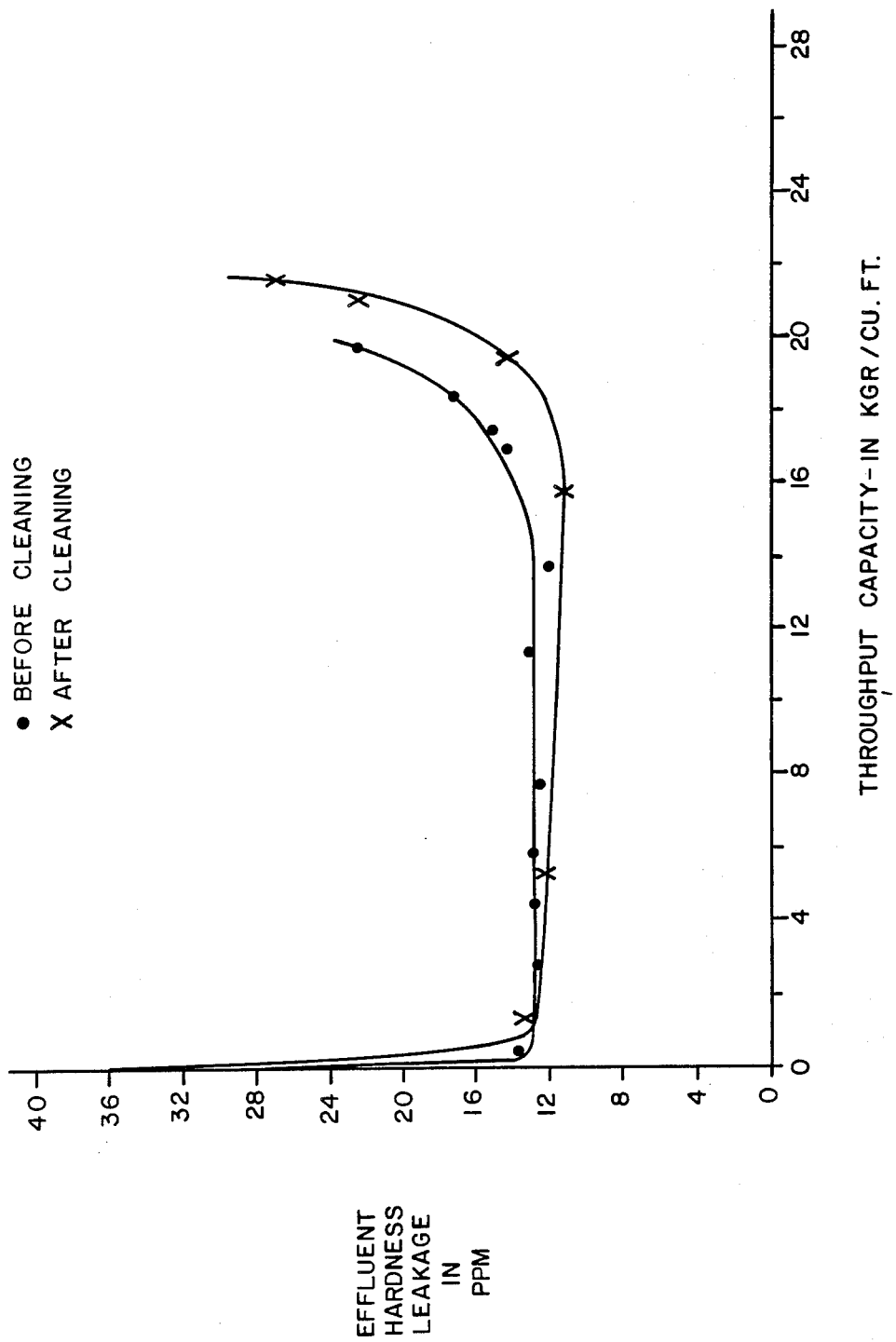
Figure 7:
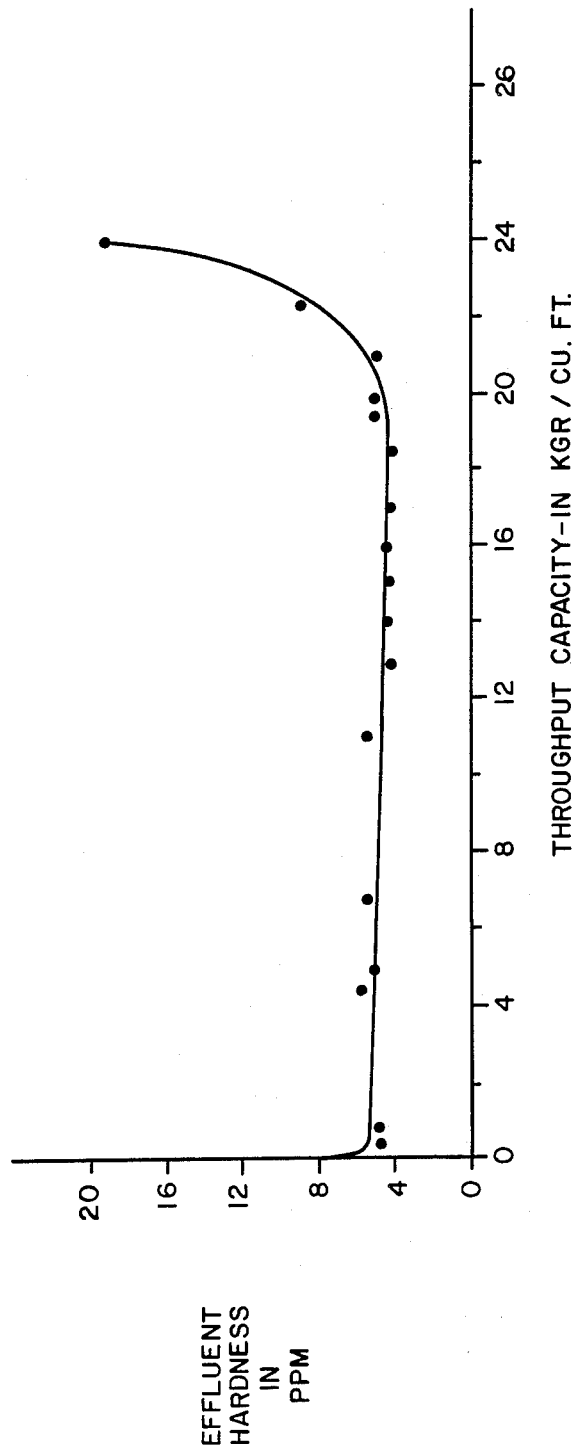
Figure 8:
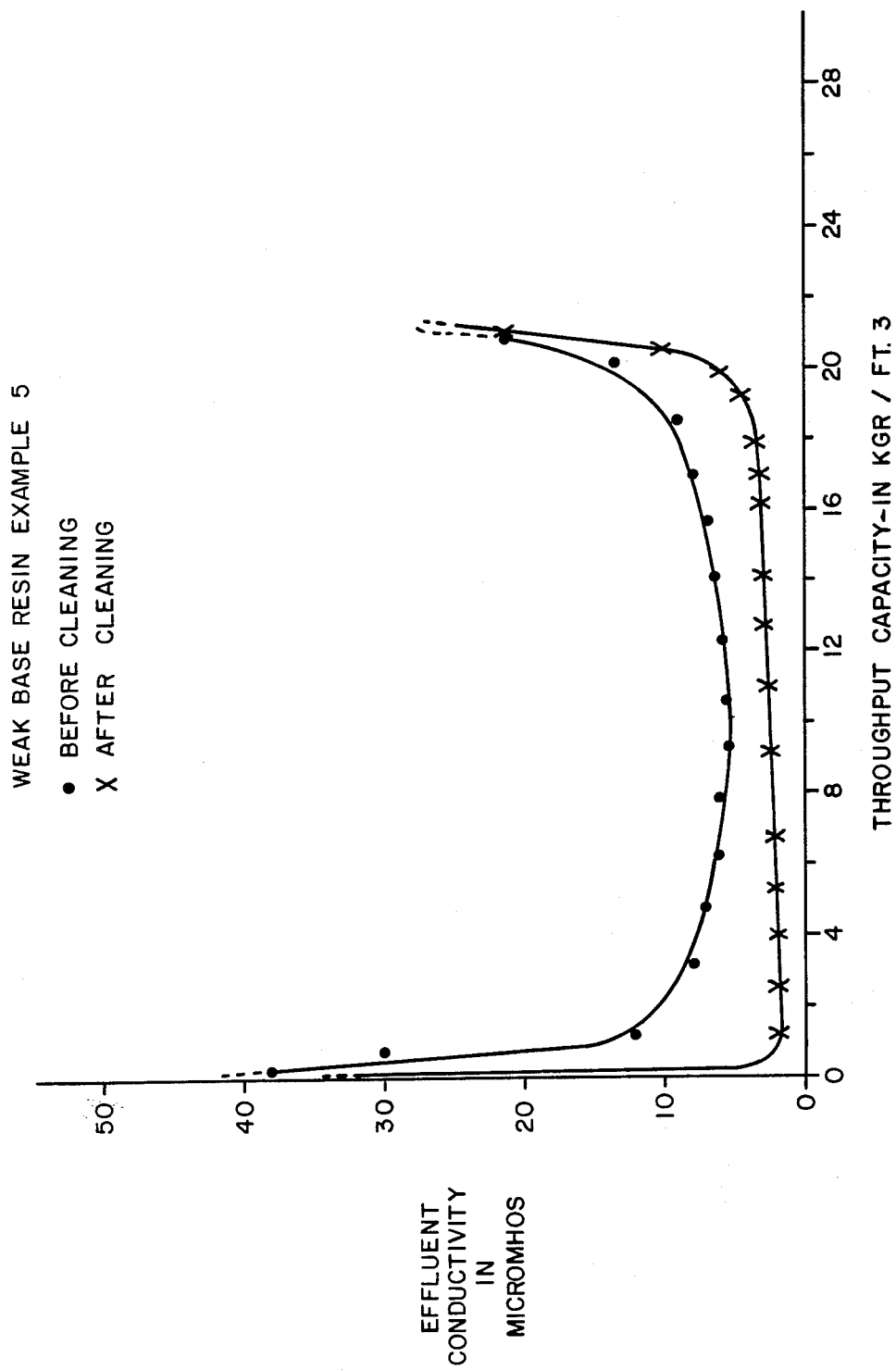
Figure 9:
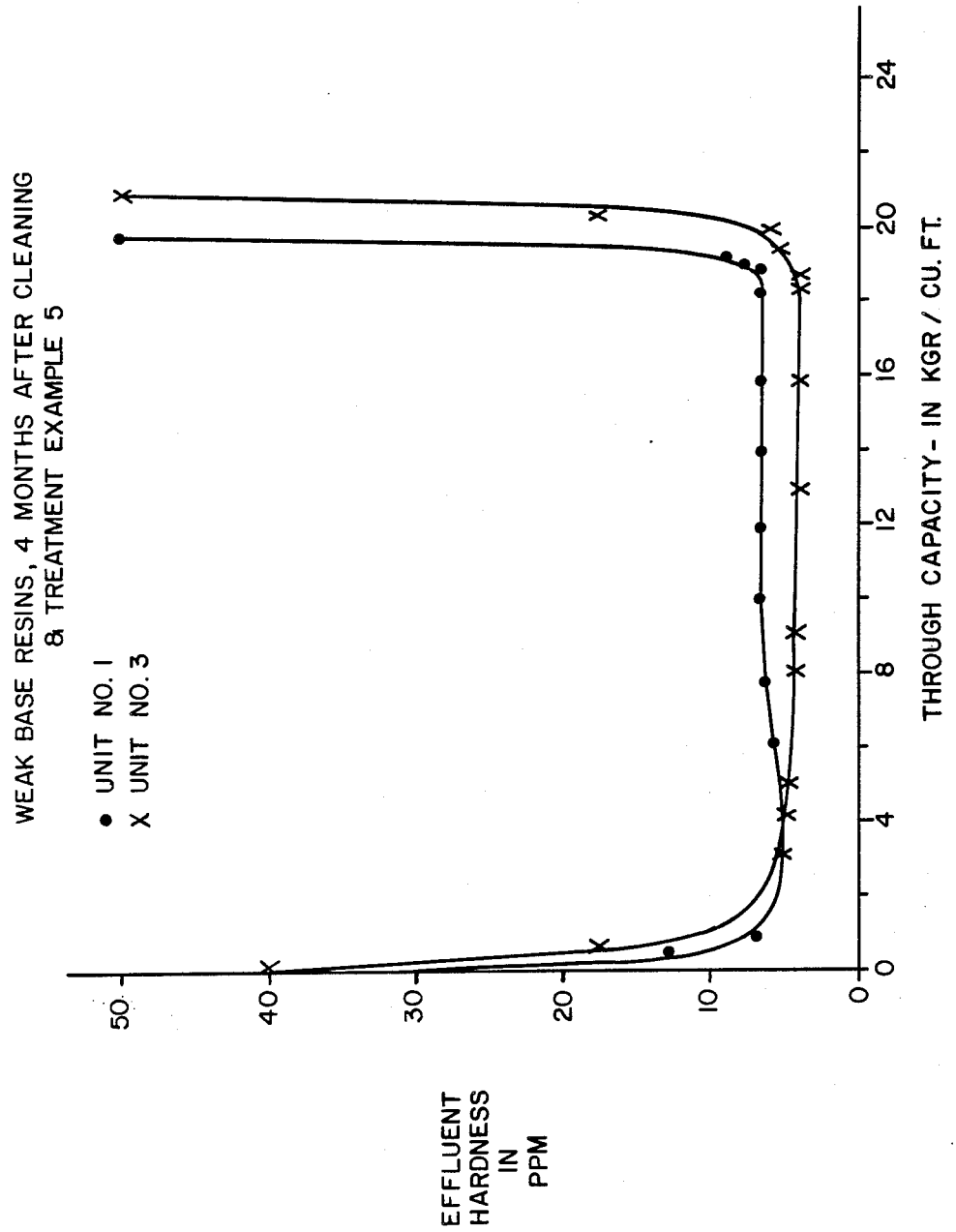
Figure 10:
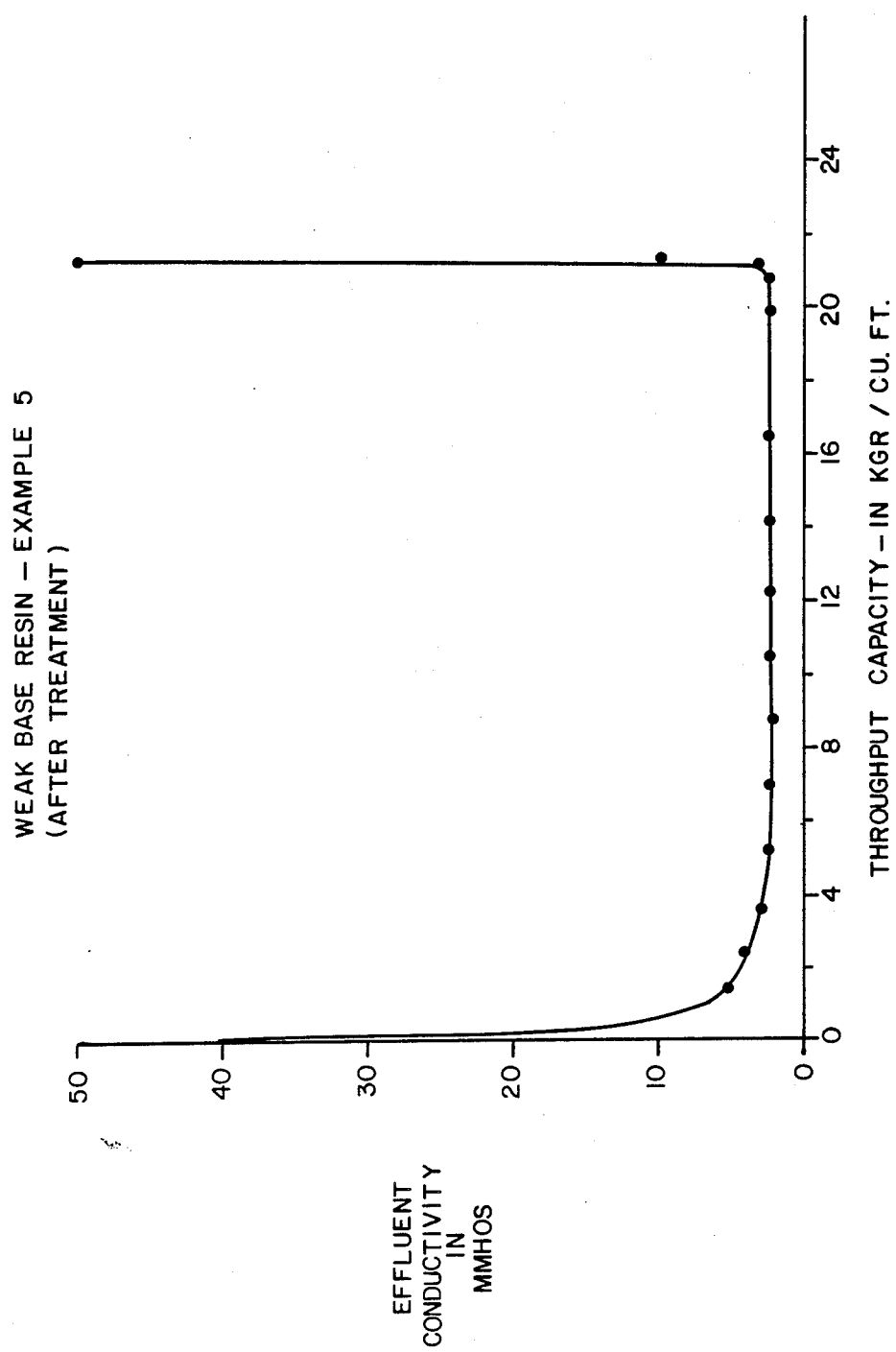
Figure 11:
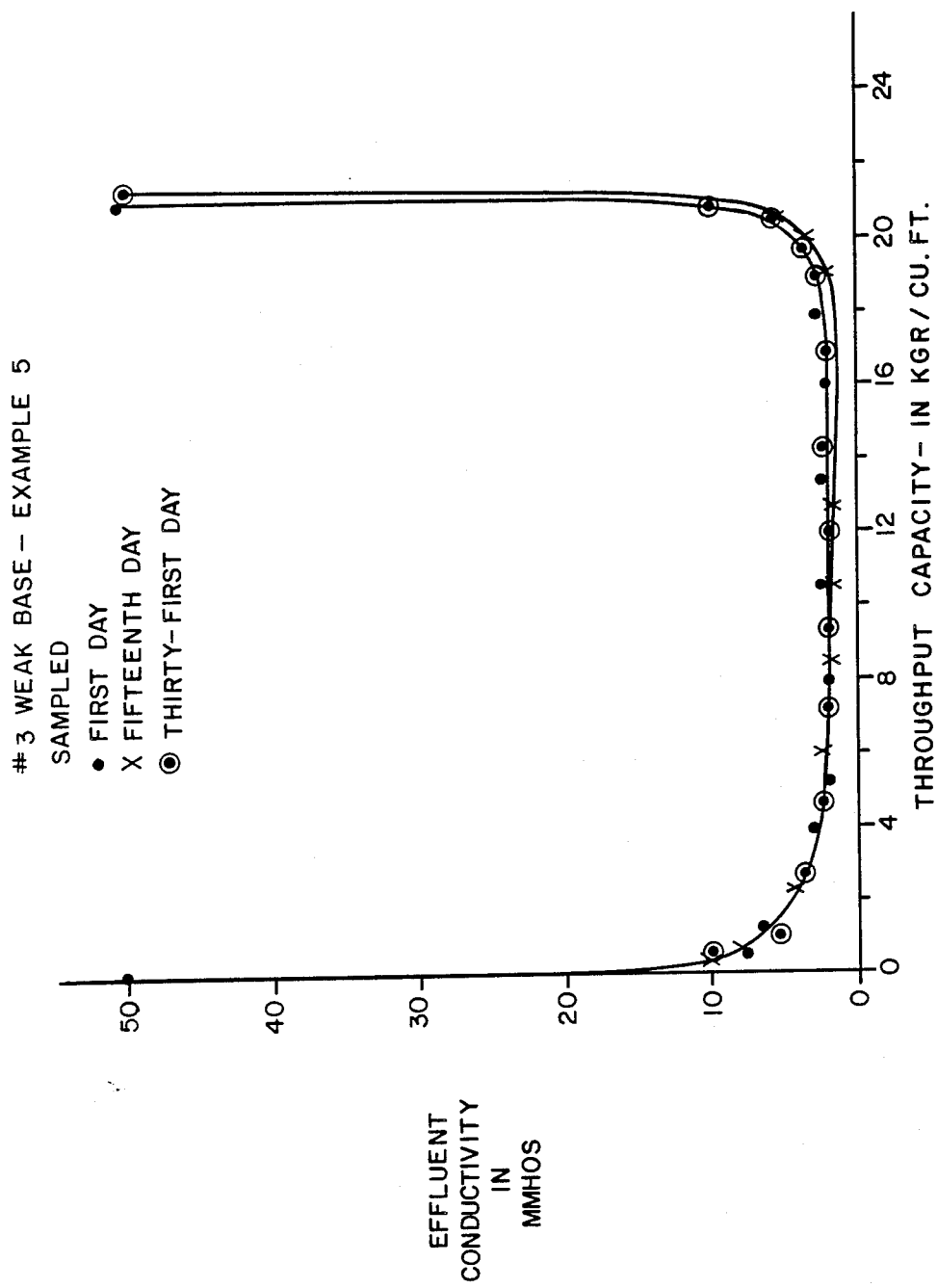
Figure 12:
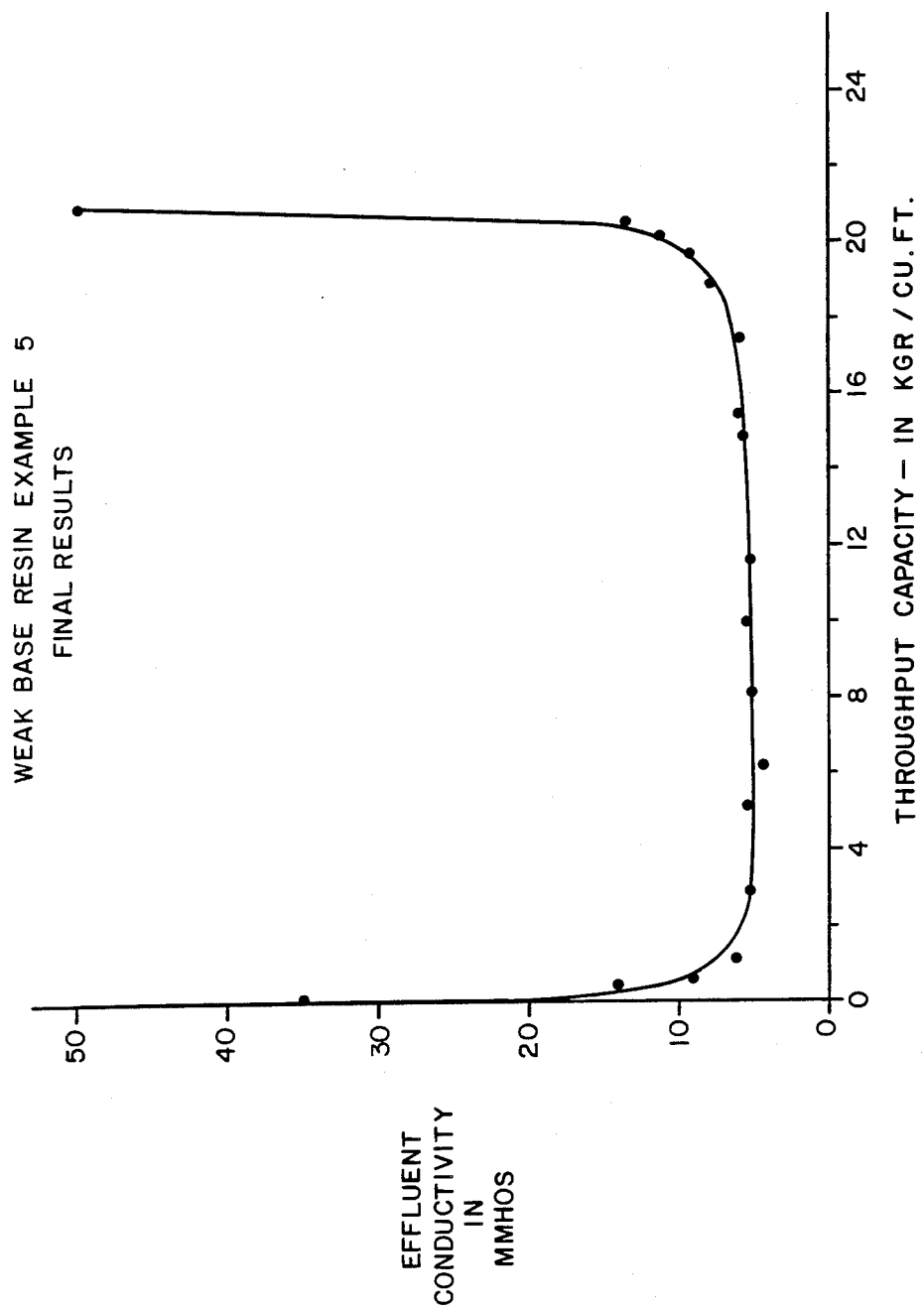

Also noteworthy is the observation that the chemical capacity, that is, the salt-splitting capacity, did not decrease any further but, rather, increased to a slight degree. In essence, the tests shown in FIG. 4 indicated that the application of the preventive maintenance program increased the resin life by at least 19 months and has successfully defouled what was allegedly an irreversibly fouled anion resin beds. Interestingly, the total exchange capacities of the resins treated with the invention on a preventive maintenance program remained unchanged for the entire length of this trial. This indicates that the invention totally inhibits and prevents further degradation of the resins and inhibits and prevents additional losses of exchange capacities for these type resins.

In summary, this field trial comparison, particularly of the two anion unit trains, indicated that the demineralizer trains had been gradually decreasing in capacity over a period of about 2 or 3 years. This gradual decrease in efficiency was attributed to resin degradation plus excessive buildup of natural organic foulants and micro-organisms and their waste products that originated from natural waters as well as a sewage treatment plant discharging upstream into the waters fed to these demineralizer trains. This field trial compared both a batch scouring, using the chemicals of this invention as well as the preventive maintenance program using these same chemicals when applied to the anionic and cationic units making up the demineralizer trains at this manufacturing facility. The batch scouring or cleaning procedure showed essentially no measurable effect although the total run lengths did show a gradual increase.

After batch treatment, a feed pump was connected to the backwash water line of the anionic unit and the chemicals of this invention were fed to the backwash waters during the first one-third of the total 30 minute backwashing cycle which occurs prior to each regeneration. Chemical feed was at an 80 ppm based on total volume of treated backwash waters. No other chemical treatment or service to these units was provided.

At the time that the preventive maintenance program was initiated, the total capacity of the unit on which this backwash system was connected was 150,000 gallons. This run length improved slowly and gradually over the next 14 months to a total run length of 227,000 gallons.

Also extremely noteworthy is that the resin in this anionic train had only 29% of its original salt-splitting capacity and 84% of its original total capacity when this trial was initiated. A recheck of the capacities of this resin about 13 months later indicated that the resin had 32% of the original salt-splitting capacity, indicating a gain of about 10% in the chemically-available total exchange capacity. This indicates that the continued preventive maintenance use of the chemicals of this invention reduce further chemical degradation of these anionic resins. The chemicals used throughout this test were a 1:1 blend of an ethoxylated nonyl phenol containing 9 moles of ethylene oxide and a bio-dispersant having been synthesized by condensing ethylene oxide with a propylene oxide adduct on propylene glycol, giving a product having a molecular weight of about 1500–5000 and an HLB between 4–10.

EXAMPLE 5

An oil refinery on the Gulf Coast has 7 demineralizer trains with a history of losing ion exchange capacity and requiring long water rinses and regenerations. Resin fouling due to various types of natural and synthetic organic materials as well as micro-organism and micro-organism waste product accumulation was suspected as major causes for this poor operating history. The cationic and weak base anionic resins of two trains within this demineralizer system were batch-cleaned with the chemicals of this invention followed by a preventive maintenance treatment on one train only. The batch cleaning treatment improved the performance of these trains to a slight extent. The demineralizer train receiving no further preventive maintenance treatment remained at poor performance level. The demineralizer train which did receive the preventive maintenance treatment using the chemicals of this invention has shown an appreciable and steady improvement.

The field trials at this Gulf Coast refinery were set up to compare results obtained on a demineralizer train #1 vs. demineralizer train #2. The train #1 was maintained under the standard practices of this refinery during the extended time periods of this test.

The demineralizer train #2 was placed on the preventive maintenance program requiring the addition of the chemicals of this invention to the first 10%, but not more than the first 50%, of the backwash cycle followed by standard regeneration and rinse techniques. The chemicals were added at each backwash over a period of approximately 9 months. Both demineralizer trains were initially backwashed and cleaned using the batch treatments described above and using the chemicals of this invention. Prior to this cleanup, the plant personnel had previously cleaned the resins in the entire demineralizer system with caustic and regenerative chemicals approximately two to three months prior to this field test being initiated.

The results of the batch cleaning which followed closely the total cleaning of the resins in place by plant personnel, the results indicated that only slight improvements in resin capacity regeneration chemical use and water use, in addition to water quality, was observed. The slight improvement was observed, however, in the train which received the treatment of this invention.

However, the train which was receiving the preventive maintenance, recovery, and restoration treatment of this invention slowly and consistently improved the performance of the resin, both the cation resin and the anion resin, in this demineralizer train until the resin had recovered nearly all of its initial capacity to treat waters containing anionic species.

This plant has remained on the preventive maintenance restoration program until the present date. The results continued to indicate that the resins, both cation and anion, contained in this demineralizing train have maintained the maximum resin capacity, salt splitting capacity, and also reveals that no further resin degradation has occurred during the last 7 months of this particular field trial. A continuous improvement in the run length of this demineralizing train has been recorded by the personnel at this Gulf Coast refinery. Tables III, IV, V, VI, and FIGS. 5, 6, 7, 8, 9, 10, 11, and 12 indicate the results obtained from monitoring the resin system during the preventive maintenance program used to recover, improve, and maintain the performance of these water-treatment exchange resins.

TABLE III

ION EXCHANGE RESINS IN DEMINERALIZER TRAINS

| Resin Unit | Type (R&H) | Replaced | (Previous) | Volume (Ft$^3$) | TEC$^b$ (meq/ml) | % Orig. TEC$^b$ | SSC$^c$ (meq/ml) | % Orig. SSC$^c$ | SCC$^d$ (kgr/ft$^3$) | % Orig. SCC$^d$ | % WRC$^e$ | % Broken Beads | Organic Fouling |
|---|---|---|---|---|---|---|---|---|---|---|---|---|---|
| 1 C | 120+ | 10/80 | (7/76) | 356 | 1.69 | 89 | — | — | — | — | 53.0 | 3 | NN$^f$ |
| 1 WB | 68 | 6/81 | (11/78) (IR93) | 306 | — | — | — | — | 20.0 | 71 | — | 0 | Large |
| 1 SB | 402 | 11/78 | 10/80 (11/78) | 326 | 1.03 | 76 | 0.77 | 57 | — | — | — | 5 | Large |
| 2 C | 120+ | 11/80 | (8/76) | 356 | 1.59 | 82 | — | — | — | — | 54.7 | 5 | NN$^f$ |
| 2 WB | 68 | 11/80 | (5/78) | 306 | — | — | — | — | 25.1 | 89 | — | 3 | Large |
| 2 SB | 402 | 8/76 | | 326 | 0.93 | 68 | 0.58 | 42 | — | — | — | 5 | Large |
| 3 C | 120+ | 11/81 | (6/74) | 356 | 1.69 | 89 | — | — | — | — | 52.9 | 3 | NN$^f$ |
| 3 WB | 68 | 11/81 | (6/78) | 306 | — | — | — | — | 25.5 | 77 | — | 0 | Moderate |
| 3 SB | 402 | 11/81 | (6/78) | 326 | 1.18 | 87 | 1.15 | 85 | — | — | — | 2 | Moderate |
| 4 C | 120 | 11/81 | (1/79) | 356 | 1.88 | 99 | — | — | — | — | 52.2 | 10 | NN$^f$ |
| 4 WB | 94 | 11/81 | (1/79) | 306 | — | — | — | — | 16.2 | 70 | — | 2 | Moderate |
| 4 SB | 402 | 1/79 | (1/64) | 326 | 1.02 | 76 | 0.84 | 62 | — | — | — | 5 | Moderate |
| 5 C | 120 | 5/78 | (12/79) | 356 | 1.71 | 90 | — | — | — | — | 52.2 | 3 | NN$^f$ |
| 5 WB | 94 | 5/81 | (5/78) | 306 | — | — | — | — | 16.2 | 70 | — | 3 | Large |
| 5 SB | 402 | 7/76 | | 326 | 0.99 | 73 | 0.70 | 52 | — | — | — | 5 | Large |
| 21 C | 120 | 2/79 | | 356 | 1.46 | 77 | — | — | — | — | 52.1 | 10 | NN$^f$ |
| 21 WB | 68 | 12/80 | | 306 | — | — | — | — | 25.1 | 85 | — | 3 | Moderate |
| 21 SB | 402 | 10/77 | | 326 | 0.99 | 83 | 0.70 | 58 | — | — | — | 15 | Large |
| 22 C | 120 | 1/79 | | 356 | 1.47 | 77 | — | — | — | — | 52.0 | 5 | NN$^f$ |
| 22 WB | 68 | 12/80 | | 306 | — | — | — | — | 25.1 | 85 | — | 2 | Moderate |
| 22 SB | 402 | 4/79 | | 326 | 1.00 | 83 | 1.00 | 66 | — | — | — | 35 | Large |

$^a$Analyses by Ion Exchange Laboratory
$^b$TEC = Total Exchange Capacity
$^c$SSC = Salt Splitting Capacity
$^d$SCC = Small Column Capacity
$^e$WRC = Water Retention Capacity
$^f$NN = Not Specifically Noted in Analysis Report

TABLE IV

PERFORMANCE
DEMINERALIZER TRAIN NO. 2 OPERATING DATA

| DAY | END SiO$_2$ | END COND. | W.B. COND. | TOTAL REGEN. | TOTAL RUN |
|---|---|---|---|---|---|
| 1 | .011 ppm | 6 MMHO | 15 MMHO | 221,900 Gal. | 966,900 Gal. |
| 2 | .014 ppm | 3 MMHO | 30 MMHO | 237,500 Gal. | 1,257,600 Gal. |
| 3 | .014 ppm | 6 MMHO | 45 MMHO | 233,300 Gal. | 1,125,910 Gal. |
| 4 | .011 ppm | 4 MMHO | 40 MMHO | 227,700 Gal. | 1,073,400 Gal. |
| 5 | .011 ppm | 4 MMHO | 20 MMHO | 235,500 Gal. | 1,009,400 Gal. |
| 6 | .011 ppm | 4 MMHO | 15 MMHO | 245,200 Gal. | 900,600 Gal. |
| 7 | .011 ppm | 4 MMHO | 10 MMHO | 241,900 Gal. | 863,000 Gal. |
| 8 | .017 ppm | 7 MMHO | 120 MMHO | — | 1,266,100 Gal. |
| 9 | .014 ppm | — | 30 MMHO | 216,500 Gal. | 1,070,000 Gal. |
| 10 | .014 ppm | 5 MMHO | 16 MMHO | 320,000 Gal. | 1,133,500 Gal. |
| 11 | .014 ppm | 5 MMHO | 17 MMHO | 220,000 Gal. | 933,500 Gal. |
| 12 | .014 ppm | 7 MMHO | 60 MMHO | 233,500 Gal. | 1,140,000 Gal. |
| 13 | .014 ppm | 6 MMHO | 45 MMHO | 202,700 Gal. | 1,112,200 Gal. |
| 14 | .017 ppm | 3 MMHO | 28 MMHO | 259,300 Gal. | 945,200 Gal. |
| 15 | .014 ppm | 4 MMHO | 19 MMHO | 214,900 Gal. | 934,600 Gal. |
| 16 | .011 ppm | 6 MMHO | 28 MMHO | 214,500 Gal. | 931,400 Gal. |
| 17 | .014 ppm | 4 MMHO | 30 MMHO | 218,000 Gal. | 954,100 Gal. |
| 18 | .017 ppm | 6 MMHO | 70 MMHO | 210,000 Gal. | 1,089,500 Gal. |
| 19 | .014 ppm | 5 MMHO | 32 MMHO | 200,000 Gal. | 1,027,900 Gal. |
| 20 | .028 ppm | 7 MMHO | 33 MMHO | 225,400 Gal. | 1,213,000 Gal. |
| 21 | .014 ppm | 5 MMHO | 34 MMHO | 220,700 Gal. | 1,200,100 Gal. |
| 22 | .014 ppm | 9 MMHO | 17 MMHO | 253,000 Gal. | 1,056,800 Gal. |
| 23 | .020 ppm | 1 MMHO | 41 MMHO | 254,700 Gal. | 1,251,500 Gal. |

TABLE V

PERFORMANCE
DEMINERALIZER TRAIN NO. 2 OPERATING DATA

| DAY | END SiO$_2$ | END COND. | W.B. COND. | TOTAL REGEN. | TOTAL RUN |
|---|---|---|---|---|---|
| 24 | .001 ppm | 3 MMHO | 36 MMHO | 220,000 Gal. | 1,245,800 Gal |
| 25 | .017 ppm | 3 MMHO | 25 MMHO | 223,700 Gal. | 1,328,400 Gal |
| 26 | .014 ppm | 4 MMHO | 19 MMHO | 253,300 Gal. | 1,240,800 Gal |

TABLE V-continued

PERFORMANCE
DEMINERALIZER TRAIN NO. 2 OPERATING DATA

| DAY | END SiO$_2$ | END COND. | W.B. COND. | TOTAL REGEN. | TOTAL RUN |
|---|---|---|---|---|---|
| 27 | .014 ppm | 9 MMHO | 90 MMHO | 211,800 Gal. | 1,250,000 Gal |
| 28 | .014 ppm | 6 MMHO | 6 MMHO | 233,900 Gal. | 1,280,400 Gal |
| 29 | .014 ppm | 6 MMHO | 12 MMHO | 218,200 Gal. | 1,052,200 Gal |
| 30 | .017 ppm | 4 MMHO | 28 MMHO | 226,000 Gal. | — |
| 31 | .014 ppm | 6 MMHO | 70 MMHO | 241,000 Gal. | 1,291,300 Gal |
| 32 | .014 ppm | 5 MMHO | 80 MMHO | 243,400 Gal. | 1,577,100 Gal |
| 33 | .017 ppm | 4 MMHO | 100 MMHO | 261,000 Gal. | 1,500,000 Gal |
| 34 | — | — | — | 258,200 Gal. | 1,332,500 Gal |
| 35 | .014 ppm | 6 MMHO | 52 MMHO | 237,000 Gal. | 1,155,200 Gal |
| 36 | .014 ppm | 5 MMHO | 70 MMHO | 256,100 Gal. | 1,414,100 Gal |
| 37 | — | — | — | 235,000 | — |
| 38 | .014 ppm | 5 MMHO | 22 MMHO | 267,900 Gal. | 1,151,300 Gal |
| 39 | .011 ppm | 7 MMHO | 20 MMHO | 300,000 Gal. | 1,050,500 Gal |
| 40 | .017 ppm | 4 MMHO | 22 MMHO | 249,500 Gal. | 1,183,200 Gal |
| 41 | .017 ppm | 4 MMHO | 18 MMHO | 243,700 Gal. | 1,097,300 Gal |
| 42 | .014 ppm | 8 MMHO | 20 MMHO | 254,800 Gal. | 1,003,900 Gal |
| 43 | .014 ppm | 8 MMHO | 75 MMHO | 300,000 Gal. | 1,383,600 Gal |
| 44 | .017 ppm | 2 MMHO | 10 MMHO | 290,000 Gal. | 1,113,800 Gal |
| 45 | .019 ppm | 10 MMHO | 22 MMHO | 264,000 Gal. | 857,400 Gal |
| 46 | .011 ppm | 3 MMHO | 20 MMHO | 268,000 Gal. | 1,364,900 Gal |

TABLE VI

PERFORMANCE
DEMINERALIZER TRAIN NO. 2 OPERATING DATA

| DAY | END SiO$_2$ | END COND. | W.B. COND. | TOTAL REGEN. | TOTAL RUN |
|---|---|---|---|---|---|
| 47 | .011 | 3 MMHO | 20 MMHO | 268,000 | 1,364,900 Gal. |
| 48 | .011 | 3 MMHO | 15 MMHO | 278,110 | 1,319,800 Gal. |
| 49 | .011 | 4 MMHO | 19 MMHO | 234,000 | 1,467,300 Gal. |
| 50 | .013 | 6 MMHO | 19 MMHO | 227,500 | 1,374,000 Gal. |
| 51 | .011 | 8 MMHO | 8 MMHO | 286,700 | 1,250,700 Gal. |
| 52 | .011 | 6 MMHO | 8 MMHO | 286,700 | 1,392,300 Gal. |
| 53 | .011 | 8 MMHO | 8 MMHO | 275,000 | 1,337,200 Gal. |
| 54 | .014 | 8 MMHO | 21 MMHO | 270,000 | 1,390,560 Gal. |
| 55 | .017 | 5 MMHO | 18 MMHO | 334,600 | 1,445,900 Gal. |
| 56 | .014 | 9 MMHO | 40 MMHO | 302,700 | 1,347,700 Gal. |
| 57 | .011 | 5 MMHO | 20 MMHO | 307,500 | 1,072,900 Gal. |
| 58 | .006 | 8 MMHO | 24 MMHO | 284,300 | 1,141,500 Gal. |
| 59 | .011 | 8 MMHO | 26 MMHO | 284,800 | 1,101,500 Gal. |
| 60 | .017 | 6 MMHO | 35 MMHO | 301,000 | 1,148,400 Gal. |
| 61 | .009 | 8 MMHO | 60 MMHO | 284,100 | 1,246,400 Gal. |
| 62 | .031 | 12 MMHO | 30 MMHO | 274,500 | 1,118,700 Gal. |
| 63 | .020 | 12 MMHO | 50 MMHO | 253,600 | 992,700 Gal. |
| 64 | .017 | 12 MMHO | 26 MMHO | 295,900 | 1,133,600 Gal. |
| 65 | .011 | 5 MMHO | 25 MMHO | 286,300 | 1,014,900 Gal. |
| 66 | .014 | 5 MMHO | 30 MMHO | 295,600 | 1,682,200 Gal. |
| 67 | .020 | 8 MMHO | 12 MMHO | 427,000 | 1,620,800 Gal. |
| 68 | .017 | 20 MMHO | 8 MMHO | 261,300 | 995,300 Gal. |
| 69 | .009 | | 15 MMHO | 273,200 | 1,021,600 Gal. |
| | | | | Average | 1,215,340 |

EXAMPLE 6

Finally, a trial was held at a chemical plant in a midwestern state of the United States. This plant was operating two water softeners for its low pressure boiler system, using standard ion exchange technology. Run lengths of this plant were only approximately 51,000 gallons, even though the resin capacity was greater than 80% of the initial capacity but less than 90% of initial capacity.

This field trial was aimed at demonstrating that the preventive maintenance program itself was capable of restoring, improving, and maintaining the performance of these water-treatment solids and ion exchange resins which were fouled with iron, organic substances, micro-organisms, and micro-organism waste products.

The operating procedures were not changed in any way during this plant trial. No batch cleaning of this resin was completed, but simply a preventive maintenance program was initiated which comprised cyclically treating the ion exchange resins within the water softener units in this plant with an effective amount of the non-ionic surfactant and bio-dispersant of this invention. This treatment was augmented by the addition in conjunction with the non-ionic surfactant and bio-dispersant described above of a quaternary ammonium biocide.

The non-ionic surfactant chosen was again the ethylene oxide adduct of an alkylated phenol which had an HLB of approximately 13-14. The bio-dispersant chosen to complete these tests consisted of an ethylene oxide condensate with propylene oxide adducts onto propylene glycol. This bio-dispersant had a molecular weight between 1500-3000 and had an HLB between 7-8.

The resin beds were treated by adding about 20 ppm of the 1:1 weight ratio of non-ionic surfactant to bio-dispersant product to the anionic resins contained within this water softener unit. The addition was made during the first one-third of the backwash cycle and was followed by a rinsing of the bed during the next two-thirds of the backwash cycle and subsequently followed by standard regeneration techniques. The cationic resin beds were backwashed using 20 ppm of the above formulation and, in addition, an effective amount of a quaternary ammonium salt biocidal compound. Again, the cleaning solution containing the non-ionic surfactant and bio-dispersant along with the biocide was added during the first one-third of the backwash cycle, was followed by a rinsing of cleaning chemicals during the last two-thirds of the backwash cycle, and was subsequently followed by standard regeneration chemicals and rinse techniques.

The results indicated that the total run lengths increased from an initial 51,000 gallons to approximately 69,000 gallons within a two-week period of time. After the first one month, the run lengths had stabilized at about 69,000 gallons and was cut back to a constant 63,000 gallon run length to place this system on an automatic control for the convenience of the operators of this chemical plant facility. This plant has operated successfully and continuously at this 63,000 gallon run length without any indicated loss of resin capacity or ion splitting capacity for a period of about 6 months.

This last field trial indicates the successful use of the preventive maintenance program alone without the need for a prior batch cleaning operation. Such a program prevents shut-down of the demineralizer train, thereby preventing down time in the generation of steam and downtime in the operation of chemical processing plants.

EXAMPLE 7

It would be anticipated by this inventor that if a system went onstream with newly charged fresh ion exchange resin, and this system was treated in the manner described above with the preventive maintenance program using the chemicals of this invention, that this system could be maintained at optimum resin capacity, optimum salt splitting capacity, and optimum gallon run lengths for a vastly improved period of time. Such a system operating with the advantages of this invention would save the operator considerable monies and costs which would normally be due to water usage, regenerating chemical usage, operating downtime, resin replacement costs, and labor costs.

EXAMPLE 8

A home water softener unit was badly fouled by accumulated debris, organic contaminants, microbiological growth, and the waste products therefrom. The home water softener unit did not have a backwash cycle prior to regeneration but, instead, went directly from operation to regeneration, then to a rinse cycle, then back again into operation.

The formulation of Example 1 was added directly to the concentrated NaCl brine which was used to regenerate this water softener unit. Concentrations were about 2000 ppm and normal regeneration with brine including the chemical formulation of Example 1 was followed by the normal rinse cycle which removed the excess brine and any residual chemical. Copius quantities of accumulated organic, inorganic, and biological debris were removed from the resin used in this home water softener. Continued treatment during each regeneration and rinse cycle using from 10 to 200 ppm of formulations including a non-ionic surfactant, a non-ionic bio-dispersant, and a fatty quaternary amine salt biocide maintained the resin in this unit at nearly original effectiveness.

EXAMPLE 9

The formulations of Example 8 were found to be only mildly soluble in the concentrated brine used to regenerate the home water softener units. To improve resin bed contact with the formulations of this invention, various coupling agents were used. These agents included high HLB materials having an HLB between about 12 and about 30. Specifically, the addition of up to equal amounts of the following compounds seemed to improve solubility of the formula of Example 1:

Coupling Agents

1. Rohm & Haas Triton DF-20, a modified ethoxylated alcohol;
2. Rohm & Haas Triton X-114, an octyl phenoxy polyethoxyethanol;
3. Westvaco Diacid 1550, a dimer acid.

Addition of the formulas of this invention, coupled with coupling agents similar to or like those listed above, would be expected to function in a process for improving and maintaining the performance of water-treatment solids which are, or tend to become, fouled with organic substances, microbiological growth, and waste products therefrom. The process should include cyclically adding these formulations, with or without a coupling agent as described above, to each regenerant cycle or backwash cycle, if separate, followed by a rinse cycle which would remove regenerant chemical as well as the formulations of this invention, including the coupling agents if their use is found necessary to maintain complete solubility or dispersability in the regenerant brine solutions.

SUMMARY

The treatment of contaminated resins with surfactants and bio-dispersants will substantially improve the performance characteristics of resins. When compared to treatments currently available to the industry, the differences in restoring ion exchange resin performances are quite substantial. In addition, the new treatment sharply decreases the bacterial growth on the resin and reduces the likelihood of discharging large amounts of bacteria into the treated water supply. Physical breakdown of resins is reduced when particles and bacterial waste products no longer accumulate and cause excessive pressure drop across the unit.

The current mode of operating an ion exchange unit is to allow the unit to operate until it is contaminated and operating difficulties are too great to continue using the unit. If the resin cleaning does not show the desired results, the resin is replaced. This is currently an accepted practice because the user of ion exchange units has no other choice.

The present invention provides:

(1) a means of preventing the accumulation of organic and microbiological foulants by treating freshly charged resins prior to or during each backwash and regeneration cycle with the non-ionic surfactant and bio-dispersant of this invention;

(2) a means of improving and maintaining the performance of these resins using the cyclic treatments described above; and (3) recovering lost resin capacity caused by fouling of these resins with organics, micro-organisms, and waste products thereof.

The advantages of such treatment programs include:

(1) the resins can be maintained in good operating condition and can be operated at a reasonably low regenerant and operating cost, and (2) the buildup of contaminants within a resin unit will be kept at a minimum, which reduces the extent of resin bead breakage. For these reasons, the cost savings attainable with the present invention can be substantial. Also, the resin bed will no longer provide excessive amounts of nutrients for bacteria, and the treated water will be less contaminated with bacteria, which is an important consideration in cases where the treated water is used in the food or beverage industry for drinking water or for pharmaceutical uses.

The use of activated carbon and other adsorbents for the pretreatment of ion exchange units is an accepted practice. These are used to remove chlorine, organics, iron, and miscellaneous particles from the water prior to an ion exchange treatment. The use of the present invention has been found to extend the usefulness of these adsorbents over a longer period of time and to limit the growth of bacteria.

The applicability of the agents and process of the present invention is not limited to ion exchange resins or adsorbents. Other products that accumulate organics, bacteria, and bacterial waste products such as, for example, reverse osmosis, ultra-filtration, or dialysis membranes, can be cleaned and maintained by the subject techniques.

Having described my invention, I claim:

1. A process for improving and maintaining the performance of water-treatment solids which are, or tend to become, fouled with organic substances, microorganisms and waste products thereof, which comprises cyclically treating said water treatment solids with an effective amount of a combination of a non-ionic surfactant and a bio-dispersant capable of producing at least a 20.0 percent biomass change when evaluated with a biometer at a treatment level of 10 ppm for one hour at about 100° F.

2. The process of claim 1 wherein a biocide is used in conjunction with the non-ionic surfactant and the bio-dispersant.

3. The process of claim 2 wherein the biocide is chosen from the group consisting of fatty quaternary ammonium salt biocides, bromo nitrilo substituted biocides, the isothiazolines, and inorganic oxidative biocides.

4. The process of claim 1 where the water-treatment solid is an ion-exchange resin.

5. The process of claim 2 where the water treatment solid is an ion-exchange resin.

6. The process of claim 4 where the ion-exchange resin is chosen from the group consisting of gel-type cation resins, gel-type anion resins, macro-porous cation resins, and macro-porous anion resins.

7. The process of claim 5 where the ion-exchange resin is chosen from the group consisting of gel-type cation resins, gel-type anion resins, macro-porous cation resins, and macro-porous anion resins.

8. The process of claim 1 wherein the non-ionic surfactant has an HLB between 6-14.

9. The process of claim 2 wherein non-ionic surfactant has an HLB between 6-14.

10. The process of claim 1 wherein the bio-dispersant is chosen from the group consisting of ethylene oxide condensates with propylene oxide adducts on propylene glycol having an HLB between 4-10 and having a molecular weight between 1500-5000 non-ionic polyethoxylated straight chain alcohols, tris cyanoethylated cocoadiamines, polyoxyethylene sorbitan ester acids, non-ionic N,N dimethyl stearamide, and non-ionic amine polyglycol condensates.

11. The process of claim 2 wherein the bio-dispersant is chosen from the group consisting of ethylene oxide condensates with propylene oxide adducts on propylene glycol having an HLB between 4-10 and having a molecular weight between 1500-5000, non-ionic polyethoxylated straight chain alcohols, tris cyanoethylated cocoadiamines, polyoxyethylene sorbitan ester acids, non-ionic N,N dimethyl stearamide, and non-ionic amine polyglycol condensates.

12. A process for improving and maintaining the performance of ion-exchange resins used to remove ionic species from aqueous systems in which said ion-exchange resins are, or tend to become, fouled with organic substances, micro-organisms, and waste products thereof, and wherein said ion-exchange resins are subject to a backwash and regeneration cycle, said process comprising treating up to the first 50 percent of backwash waters used during each backwash cycle with an effective amount of a combination of a non-ionic surfactant and a bio-dispersant capable of producing at least a 20.0 percent biomass change when evaluated with a biometer at a treatment level of 10 ppm for one hour at about 100° F.

13. The process of claim 12 wherein a biocide is used in conjunction with the non-ionic surfactant and the bio-dispersant.

14. The claim 13 wherein the biocide is chosen from the group consisting of fatty quaternary ammonium salt biocides, bromo nitrilo substituted biocides, the isothiazolines, and inorganic oxidative biocides.

15. The process of claim 12 wherein the ion-exchange resin is chosen from the group consisting of gel-type cation resins, gel-type anion resins, macro-porous cation resins, and macro-porous anion resins.

16. The process of claim 13 wherein the ion-exchange resin is chosen from the group consisting of gel-type cation resins, gel-type anion resins, macro-porous cation resins, and macro-porous anion resins.

17. The process of claim 12 wherein the non-ionic surfactant has a HLB between 6-14.

18. The process of claim 13 wherein the non-ionic surfactant has an HLB between 6-14.

19. The process of claim 12 wherein the bio-dispersant is chosen from the group consisting of ethylene oxide condensates with propylene oxide adducts on propylene glycol having an HLB between 4-10 and having a molecular weight between 1500-5000, non-ionic polyethoxylated straight chain alcohols, tris cyanoethylated cocadiamines, polyoxyethylene sorbitan ester acids, non-ionic N,N dimethyl stearamide, and non-ionic amine polyglycol condensates.

20. The process of claim 13 wherein the bio-dispersant is chosen from the group consisting of ethylene oxide condensates with propylene oxide adducts on propylene glycol having an HLB between 4-10 and having a molecular weight between 1500-5000, non-ionic polyethoxylated straight chain alcohols, tris cyanoethylated cocadiamines, polyoxyethylene sorbitan ester acids, non-ionic N,N dimethyl stearamide, and non-ionic amine polyglycol condensates.

21. A process for preventing fouling of freshly charged ion-exchange resin beds with organic substances, micro-organisms, and waste products thereof, which comprises cyclically treating during each backwash and regeneration cycle said ion-exchange resins with an effective amount of a combination of a nonionic surfactant and a bio-dispersant capable of producing at least a 20.0 percent biomass change when evaluated at a treatment level of 10 ppm for one hour at about 100° F. when evaluated with a biometer.

22. The process of claim 1 where the ratio of nonionic surfactant to biodispersant is within the range of 0.1:10 to 10:1.

23. The process of claim 12 where the ratio of nonionic surfactant to biodispersant is within the range of 0.1:10 to 10:1.

24. The process of claim 21 where the ratio of nonionic surfactant to biodispersant is within the range of 0.1:10 to 10:1.

* * * * *